(12) United States Patent
Gray et al.

(10) Patent No.: US 12,083,564 B2
(45) Date of Patent: Sep. 10, 2024

(54) SEQUESTERING BIOMASS IN WATER

(71) Applicant: Aliquam Holding, LLC, Doral, FL (US)

(72) Inventors: Luke Gray, Exeter, NH (US); Alexander Slocum, Bow, NH (US)

(73) Assignee: Aliquam Holding, LLC, Doral, FL (US)

( * ) Notice: Subject to any disclaimer, the term of this patent is extended or adjusted under 35 U.S.C. 154(b) by 526 days.

(21) Appl. No.: 17/414,166

(22) PCT Filed: Dec. 23, 2019

(86) PCT No.: PCT/US2019/068295
§ 371 (c)(1),
(2) Date: Jun. 15, 2021

(87) PCT Pub. No.: WO2020/132673
PCT Pub. Date: Jun. 25, 2020

(65) Prior Publication Data
US 2022/0080480 A1    Mar. 17, 2022

Related U.S. Application Data

(60) Provisional application No. 62/870,428, filed on Jul. 3, 2019, provisional application No. 62/820,088, filed on Mar. 18, 2019, provisional application No. 62/783,740, filed on Dec. 21, 2018.

(51) Int. Cl.
*B09B 1/00* (2006.01)
*A01D 44/00* (2006.01)
*B63B 35/32* (2006.01)

(52) U.S. Cl.
CPC .............. *B09B 1/002* (2013.01); *A01D 44/00* (2013.01); *B63B 35/32* (2013.01)

(58) Field of Classification Search
CPC .......... B09B 1/002; A01D 44/00; B63B 35/32
See application file for complete search history.

(56) References Cited

U.S. PATENT DOCUMENTS

| | | | |
|---|---|---|---|
| 3,456,824 | A | 7/1969 | Smith |
| 3,595,161 | A | 7/1971 | Webb |
| 3,808,779 | A | 5/1974 | Randall |
| 4,829,923 | A | 5/1989 | Copson et al. |
| 5,820,300 | A | 10/1998 | Sonoda et al. |

(Continued)

FOREIGN PATENT DOCUMENTS

| | | | | |
|---|---|---|---|---|
| CA | 2846047 A1 | * | 9/2014 | ............. A01D 44/00 |
| EP | 3636065 A1 | * | 4/2020 | |

(Continued)

OTHER PUBLICATIONS

International Search Report and Written Opinion, PCT Application No. PCT/US2019/068295, mailed Mar. 19, 2020 (10 pages).

*Primary Examiner* — Anthony D Wiest
(74) *Attorney, Agent, or Firm* — Occhiuti & Rohlicek LLP

(57) ABSTRACT

Buoyant matter, and particularly biomass such as seaweed, is sequestered deep in a body of water, fey causing the matter to lose it buoyancy and sink and remain sunk for an extended period. In some examples, the matter is pumped to below a depth at which is loses its natural buoyancy as a result of the ambient water pressure resulting in it naturally sinking to the bottom.

28 Claims, 17 Drawing Sheets

(56) References Cited

U.S. PATENT DOCUMENTS

| | | | |
|---|---|---|---|
| 6,357,213 B1 * | 3/2002 | Dillingham | A01D 44/00 56/8 |
| 2013/0164083 A1 | 6/2013 | Elia et al. | |
| 2015/0298184 A1 | 10/2015 | van Waning | |

FOREIGN PATENT DOCUMENTS

| | | |
|---|---|---|
| FR | 2712515 A1 | 5/1995 |
| FR | 3037004 A1 | 12/2016 |
| KR | 20170032920 A | 3/2017 |

* cited by examiner

SEQUESTERING BIOMASS IN WATER

CROSS-REFERENCES TO RELATED APPLICATIONS

This application is a 371 application of International Application No. PCT/US2019/068295 filed Dec. 23, 2019, which claims the benefit of the following U.S. Provisional Applications, which are incorporated herein by reference: No. 62/783,740, filed Dec. 21, 2018; No. 62/820,088 filed Mar. 18, 2019; and No. 62/870,428 filed Jul. 3, 2019.

BACKGROUND OF THE INVENTION

This invention relates to sequestering buoyant matter in water, and more particularly to sequestering buoyant biomass such as sargassum in the deep ocean.

Floating macroalgaes, organisms, and other pelagic debris have caused serious problems for fishing and tourism industries worldwide. In particular Caribbean beaches are being inundated by pelagic sargassum, a type of holopelagic macroalgae that has been growing in unprecedented quantities in the Central Western Atlantic (CWA), more specifically in the Northern Equatorial Recirculation Region (NERR), and causing much economic, social, ecological and environmental damage in the region. This explosion of growth is thought to be caused by warmer ocean temperatures, increased ocean alkalinity, increased nutrient upwelling of the coast of West Africa, and increased iron dust depositing from the Sahara (due to deforestation of the borders of the Sahara), and increased agricultural runoff from the Amazon and Congo rivers. Rooted in climate change and improper land use by humans, these blooms seem certain to recur for years to come. These blooms should be seen in the broader trend of macro-/microalgal blooms, plastics accumulation, and the rise of many invasive species in our oceans, which seem to be human caused, permanent, and even accelerating phenomena in some cases.

Sargassum is one of the most common macroalgae in the world and the only holopelagic seaweed on the planet (meaning that it floats for its entire lifecycle). Sargassum was first observed in the Sargasso Sea by early explorers and was named "sargassum" after the Portuguese word for "grape" because of the grape-like pneumatocysts, the bladders that give the sargassum positive buoyancy.

A typical consolidated sargassum mat may be a few kilometers long and a few hundred meters wide. In the open ocean, loosely associated "slicks" of consolidated sargassum mats, can be tens of kilometers wide by hundreds of kilometers long. A typical mat could take weeks to collect and cost hundreds of thousands of dollars to dispose of if it is allowed to make landfall. All the while tourism, coastal business, and native lives will be disrupted.

When sargassum makes landfall, it dies, rots, dyes water dark brown, creates an eyesore, emits a terrible smell, and inhibits swimming. This has significantly hurt tourism in Caribbean nations, where the industry directly contributes over 4% of combined GDP and supports over 700,000 jobs (WTTC, 2017). Additionally, sargassum has directly affected island life—fumes and airborne "dust" from the rotting sargassum can cause nausea, respiratory irritation, and corrosion of machinery. Direct contact from sargassum corrodes boats, breakwaters, and other man-made infrastructure. Thick mats of sargassum can stop small outboard motors, disrupting coastal villages and business activities. Eutrophication from decay of the sargassum suffocates shallow-water animals and area coverage obstructs photosynthesis of benthic plants (i.e., corals). Finally, decaying sargassum in coastal waters, on beaches, and in disposal areas/landfills emits large amounts of methane into the earth's atmosphere.

As of the filing of this application, dominant management method across the Caribbean, in civilian and high-value resort areas alike, is manual cleanup. High-value resort areas have started using heavy-duty machinery and some specialized machines for removing sargassum from beaches. In even more select locations, long lengths of floating barriers have been installed immediately in front of beaches. These barriers are extremely expensive and prone to damage. The barriers require that sargassum be constantly removed from in front of barriers using specially built barges, equipped with large conveyors, otherwise barriers can suffer damage and/or sargassum can be pushed under the floating barriers and land on the beaches, usually only 30-50 m behind said barriers.

The aforementioned solutions to the problem of sargassum invasions in the Caribbean are insufficient for many reasons: (1) current solutions are very expensive (requiring large amounts of manpower and special machines/infrastructure; so far requiring heavy public/private subsidy), (2) current solutions have turned resort areas into "construction zones" creating as much disruption and visual pollution as sargassum does itself, (3) current solutions' inflexibility exposes them to a high level of risk (barriers, special machines could be rendered useless if sargassum migrates to other regions or simply stops blooming altogether, (4) current solutions exacerbate climate change by using large amounts of fuel to merely move the methane-emitting, heavy metal-leaching sargassum from one rotting place (beaches) to another (landfill or open pits), (5) special machinery/infrastructure is prone to damage (conveyors have thousands of moving parts susceptible to corrosion from contact with sargassum and barriers are prone to biofouling if not cleaned regularly) and difficult to service (requiring engineers from foreign manufacturers to make frequent service trips), and/or (6) current solutions are not really solutions at all because they all allow sargassum to make landfall (or come very close to making landfall in the case of floating barriers) where it causes all the same problems for tourism, human health, ecology, and the environment that have been mentioned above.

Most companies offering barrier installation and/or barrier cleaning/maintenance stake their future profitability, affordability, and independency from subsidy on transforming/valorizing the sargassum they collect from barriers into saleable products. Much academic research and public enthusiasm has been spent on the prospect of turning sargassum into bioplastics, solid/liquid fertilizer, pharmaceuticals, nutraceuticals, building material, bioethanol, and biogas substrate, among other products. The problems with this transforming/valorization model are several: (1) there has yet to be a single product with high-enough "value-added" to fund these collection and transformation operations (which would require larger operations with supply-chain, transformation factories, sales and marketing, and distribution), (2) it will take time to develop a market for even one sargassum product and there is no guarantee the demand will equal the amount of sargassum landing on beaches, and/or (3) there are technical challenges with transforming sargassum (which will take time to overcome) and potentially damming risks related to heavy metals shown to be present in sargassum (that it absorbs from the open ocean).

All current solutions suffer from the fundamental disadvantage that they wait for sargassum to land on beaches and/or barriers before addressing it. There is no lead time afforded to the people and machines doing the cleanup, which means vast system scales (many workers and many machines) are needed to blanket coastlines and keep them somewhat habitable. It is a near impossible task.

In most places (civilian coastline), there is no means for sargassum management. As a result, locals are left to deal with negative effects to health and standards of living while compromising their own economic wellbeing to conduct cleanup efforts.

SUMMARY OF THE INVENTION

A solution is urgently needed to address the sargassum problem in the Caribbean. One or more embodiments described herein can be used for "sargassum ocean sequestration" (hereafter referred to as "SOS"). In particular, SOS can involve collecting sargassum from the ocean and sequestering it on the deep ocean floor.

One example of a method for sequestering sargassum is to gather and pump sargassum to a critical depth in the ocean at which its pneumatocysts (air bladders responsible for its buoyancy) are sufficiently compressed such that the sargassum becomes negatively buoyant and continues sinking on its own. This method is hereafter referred to as "pump-to-depth" (IPD). This critical depth of about 150-200 meters also happens to exceed the mixed layer of the Caribbean (90-110 m depending on the time of year) so that sargassum will not be carried back up to a depth where it may become positively buoyant again (the compression imposed by hydrostatic pressure at the critical depth of 150-200 meters does not necessarily irreversibly rupture the sargassum pneumatocysts—this would require a much greater depth and much more pumping energy expenditure).

In another example of a method for sequestering sargassum, concentrations of floating sargassum are identified and the path of travel driven by currents is predicted such that vessels can be deployed to intercept and pump sargassum directly down to a critical depth at which it becomes negatively buoyant, due to hydrostatic pressure at the critical depth sufficiently compressing its bladders/pneumatocysts, so that it continues sinking to the bottom of the ocean. To carry out such a method, a ship deploys booms or funnel structures to gather and guide the sargassum towards pump inlet devices, which may comprise vees, planes, scoops, long lengths of hose or pipe with distributed suction, weirs, and/or various designs of augers to prevent clogging and provide a controlled infeed rate to one or more pumps, such that the sargassum can be directly pumped, through a downwardly deployed pipe or hose, to a critical depth at which it will continue to sink to the bottom of the ocean. If the sargassum is not over deep water, or if it is in an area otherwise preventing sequestration, such as in a harbor or along an offshore barrier or beachfront, sargassum is first collected by using one of the aforementioned pump inlet devices, mounted to a variety of deployment vessels, or by other means, and deposited into a container, such as a barge, and then transported to a sufficiently deep area of the ocean, where it is then removed from the barge and sunk to depth by pumps, by simply releasing it after it has been processed to render it negatively buoyant, for example by actively crushing it or by taking steps to inhibit its metabolic activity. These systems are also applicable to other types of floating biomass or debris in different parts of the world, such as algae, seaweed, jellyfish, and plastic in the great garbage patch.

In one aspect, the invention features methods and systems for sequestering buoyant matter deep in a body of water. A suitable body of water is an ocean. However, other bodies can also be used.

In some embodiments, the invention also includes methods and systems for gathering or collecting the buoyant matter. Some embodiments include mass-transport systems for transferring the buoyant matter. Yet other embodiments include processors for causing the buoyant matter to have negative buoyancy, ensuring that it sinks and remains sunken for extended periods.

A particularly important form of buoyant matter for sequestration is seaweed, and in particular, sargassum. Other types of biomass, such as floating jellyfish can likewise be sequestered, as well as other undesirable floating masses, including manmade litter, such as floating plastics.

Among the sequestration mechanisms are those in which the buoyant matter is made to sink below a critical depth. In those cases in which buoyancy depends on air-filled sacs, the volume of the sac decreases as surrounding pressure increases. Eventually, there comes a point at which the volume of the sac is too small to buoy the buoyant matter upwards, at which point it develops a tendency to sink.

Some bodies of water have a mixed layer that extends from the surface to below the critical depth. This mixed layer develops currents that can cause upwelling. To ensure that the buoyant matter remains sequestered, the critical depth to which the material is made to sink is therefore both below the mixed layer and sufficiently deep for water pressure to cause the buoyant matter to develop a negative buoyancy.

Transport to beyond the critical depth is carried out, in some embodiments, by pumping the buoyant matter beyond the critical depth. In other embodiments, transport to beyond the critical depth is achieved by pushing the buoyant matter to below the critical depth.

Suitable pumps for pumping the buoyant matter below the critical depth include those with a sufficiently long hose, axial flow or end-suction pumps, centrifugal pumps, and submersible pumps. The energy to drive the pump can arise from electricity, hydraulic forces, or diesel.

Another device for transporting the buoyant matter pushes the buoyant matter below the critical depth is a weighted cage.

In some embodiments, the buoyant matter's buoyancy is made to change at, near, or above sea level. In those cases in which the buoyant matter acquires its buoyancy as a result of air-filled sacs, the sacs can be mechanically compromised, for example by grinding or crushing. Suitable crushers include horizontal and vertical crushers.

Alternatively, the buoyant matter can be drawn into a low-pressure region to cause the sacs to explode. This can be carried out by passing it through a venturi chamber.

In those cases in which the buoyant matter is alive, such as in the case of seaweed, including sargassum, it can simply be killed and left submerged. Eventually, it will become waterlogged and sink.

In the embodiments in which the buoyancy is altered at the surface, it is not, in principle, necessary to transport the material below the critical depth. However, it is advantageous to do so to avoid the possibility of upwelling. Transporting the altered material below the mixed layer inhibits the possibility of its return via upwelling.

A variety of methods and devices can be used in connection with gathering the buoyant matter. These methods and devices generally increase the concentration of buoyant matter that enters the pump, thus increasing the amount of buoyant matter that will be pumped per unit time. Some of these methods and devices rely on a funnel or vee-shaped structure that guides buoyant matter towards an inlet. These include such structures as booms and purse seines. Others rely in part on maintaining a vertical position of a gathering structure relative to undulating level of the ocean that results from waves. Examples include a wave-following crane, or a pivoting structure with floats. These ensure that the inlet to the pump spans the vertical range at which the concentration of buoyant matter is at its greatest.

In some embodiments, the gathering structure is a distributed structure, such as a boom having holes and some suction means that will urge buoyant matter to enter these holes so that it can be transported to a pump inlet. An advantage of such a distributed arrangement includes the possibility of reducing the flow rate through any one of the holes, thereby enabling a high aggregate now rate without resulting in hydrodynamic-related disadvantages that may impede entry of the matter at any one of the holes.

In some embodiments, it is useful to provide a multi-hose reel, a hose reel with an overboard stinger, and a cantilevered hose reel.

A system along the lines of the foregoing can be deployed on any of a variety of locations, including the bow or stern deck of a boat, a submarine, a self-propelled barge, an autonomous craft, a remotely-operated vehicle, a catamaran, a trimaran, a bulk-carrier, a self-unloading ship, an artisanal boat, a commercial crew boat, a fishing boat, an oilfield utility boat, a tug boat, a purse seiner, a subsea trawler, an outrigger trawler, or a whaling ship.

Collection systems include those deployed on a self-propelled vessel as well as those deployed on or near the shore, for example those that include barriers and one or more inlets strategically placed along the barriers.

Collection systems deployed on a self-propelled vessel include those that pump the floating matter to the correct depth and those that crush the floating matter and release it. The systems that pump the floating matter include those that move while pumping and those that pump while stationary.

Systems that pump floating matter while the vessel moves include those in which the vessel is equipped booms and funnels, those with parallel inlets, and those with extended suction booms for achieving a high flowrate of floating matter. In any of these cases, it is possible to use a planing or auger device to promote efficiency of gathering.

In any of the foregoing deployments, it is also possible to feed something other than a pump, such as a venturi tube. The use of a venturi tube causes a slowly moving slurry to enter a wide tube, which then tapers in the downstream direction, thus forcing the slurry to accelerate. This lowers pressure and therefore causes air-filled bladders to explode.

Any of the foregoing deployments can have pumps placed in parallel. This permits the capacity to be adjusted over a wide range. In systems with many parallel pumps, it is possible to send as much as a million gallons per minute for pumping.

Some of these embodiments also include two-stage systems for feeding the pump. Examples include a conveyor or a two-stage conveyor similar to that used in a typical snowblower. Other examples include a simply suction feed, a wet vac, a plow, or an onboard sump that feeds the pump that pumps the floating matter downward.

Systems that pump downward while the vessel is stationary include those equipped with a boom that maintains a 0-degree heading, those that include a sump inlet, auger devices, or an extended T-shaped suction structure. Among these are embodiments with parallel suction structures to promote a higher intake rate. Systems that pump downward while the vessel is stationary include those equipped with purse seins.

As noted above, some systems that are deployed on a self-propelled vessel include those that crush the floating matter and release it. In these embodiments, the mechanism for gathering the floating matter is much the same as that used for gathering floating matter that is to be pumped downward.

The systems that crush buoyant matter include those that rely on transverse rollers in the water. The rollers can be placed on outriggers or otherwise pushed or towed as the vessel moves. Also included in these embodiments are those that rely on a two-stage system. Examples include a sump inlet with auger devices, a suction boom, a planing inlet, a plow, a simple suction house, a conveyor, a structure similar to a modified snowblower, a wet vac, and a plow feed, all of which can be used to feed an onboard rolling crusher that either jettisons the crushed buoyant matter overboard or through a moonpool.

Collection systems deployed on or near the shore include those deployed on a catamaran or trimaran barge or a deck of a boat with a shallow draft. These boats be equipped with funnels and auger devices, planing inlets, suction booms, plow conveyors, wet vac systems, or two-stage conveyors similar to those found in a snow blower. Embodiments of such collection systems include those that are remotely-operated and those that operate autonomously.

Other examples of such collection systems include near-shore purse seines and those that include barriers that are lined with a seine boom for pulling in built-up buoyant matter into an auger device or a sump inlet. Among these are embodiments that include one or more extended T-shaped suction devices.

In those systems that collect near the shore, the buoyant matter can be delivered to a pump on a vessel or a pump on the shore. A suitable location for a pump is a location at which the buoyant matter has been concentrated, whether actively, using plows, for example, or passively, by currents. These pumps would then pump the gathered buoyant matter into a truck or another transport device to be carried out to sea.

Other examples of collection systems are those that are disclosed on hybrid collection-and-sequestration specialty vessels. These vessels have the carrying capacity to collect buoyant matter near the shore and to then transport it to deep water for sequestration. Such vessels are also capable of carrying out sequestration immediately if they are already at a site that is deep enough for sequestration. Such vessels include any of those described above but with the added feature of a holding facility with significant capacity and a mechanism for transporting buoyant matter from the holding facility to the sequestration means, whether it be a pump or a crusher or Venturi device.

Examples of hybrid vessels include a barge that mitigated to collect and sequester either at different times or simultaneously. Also among these embodiments are ships that pump buoyant matter into a barge that is later taken out to sea to carry out the sequestration process. Also among these embodiments are catamarans or other multi-hull vessels that have both a conveyor system and a pumping system. Other embodiments of hybrid vessels include landing craft, in which the bow space that is normally used to ferry troops or cargo can be used to transport buoyant matter, and in which a conveyor has been mounted to convey the buoyant matter from the bow space to a crusher or pump aboard the landing craft. Other example of such hybrid vessels are self-unloading carriers.

Systems can also be deployed on a barge that is not self-propelled. Such a barge can be placed near the shore for collection of buoyant matter and then towed out to deep water for sequestration thereof.

Embodiments of such a barge include those that have bin discharge. One example of a bin discharge relies on live bottom screws. Another relies on a converging hopper.

Other examples of such a barge include those in which a through flow of seawater is present. This can be achieved by constantly admitting seawater through portholes or pumping it into the barge via a secondary pump. A slurry of this water and the buoyant matter is them pumped directly from the barge's containment volume to the critical depth below the ocean's surface using an auger device or using suction.

Also among the embodiments of the barge are those that rely on other means of discharging buoyant matter from the barge to feed a sequestration process, whether it be the crushing process or the deep pumping process described above. These include a ram or a mechanism similar to that used in a dump truck. Other examples include barges that are equipped to carry out ballast tipping similar to the method used by a log barge to dump a load of logs into water. This embodiment would dump the buoyant matter near an intake of a sequestration pump, for example.

In yet other embodiments, the barge implements a bulldozer. This is particularly useful for large and flat barges.

Other barges implement conveyors, such as rakes or buckets, or bucket cranes.

In yet other embodiments, the barge features a removable liner unloads the buoyant matter upon removal.

Methods and systems according to the invention include those used in connection with in-situ and ex-situ sequestration. Generally, "in-situ" sequestration refers to situations in which the matter is submerged at or near the location where it is collected, and "ex-situ" sequestration involves submerging the matter at some distance from the collection location.

Methods and systems that carry out in-situ sequestration intercept buoyant matter over deep water, i.e., water that is deeper than the critical depth, and sequester it as soon as possible thereafter.

The in-situ process includes gathering the buoyant matter, feeding the buoyant matter to a sequestration device, and then sinking the buoyant matter to sequester it.

The gathering process increases the concentration of buoyant matter in seawater so that the enriched seawater can be fed into the sequestration device. Suitable systems and methods involve the use of a boom, which can be either anchored or towed. Embodiments include those that use a J-boom, those that use a U-boom, and those that use a V-boom. Gathering can also be carried out using a purse seine boom, which is either anchored or towed. Also among the structures is a funnel. In some cases, the form of the vessel is itself suitable for concentrating the buoyant matter. For example, a catamaran can be used for this function.

The process of feeding the buoyant matter to the sequestration device is carried out, in some embodiments, using an inlet having an auger. Such auger-based inlets include those with a coaxial auger and a transverse auger.

Other embodiments rely on a sump inlet. These embodiments include those that rely on a circular sump inlet and those that rely on a rectangular sump inlet.

Yet other embodiments carry out the feeding by using a sump inlet. Among these are embodiments that allow the sump inlet to float freely and embodiments that curtain the free movement of the sump inlet. These include embodiments that use a linear constraining mechanism and those that include a rotary constraining mechanism. Certain embodiments constrain the sump inlet so that it only has one degree-of-freedom.

In some embodiments, the feeding step is carried out by having the buoyant matter travel through an extended suction inlet. Among these are embodiments that use a boom and a tee.

In some embodiments, the feeding step is carried out using a two-stage system similar in principle to that used in a snowblower. Among these are transport systems in which an auger cooperates with an impeller to transport buoyant matter from the ocean towards a sequestration mechanism.

Yet other embodiments include those that rely on a planing inlet, those that rely on a plow, and those that rely on conveyors, including buckets and rakes. A particularly useful embodiment, given that the buoyant matter is floating in seawater, relies on an industrial wet vacuum to convey the buoyant matter to its destination.

The sequestration mechanism available for in-situ sequestration include those already discussed, namely a pump to pump the buoyant matter to beyond the critical depth, a crushing mechanism to destroy the bladders that the buoyant matter relies on to float, and a Venturi mechanism to promote explosion of those bladders by lowering external pressure. In some embodiments, the crushing step is followed by pumping the buoyant matter, now crushed, to a thermocline or to some depth after crushing.

Methods and systems that carry out ex-situ sequestration collect buoyant matter at one location, for example at or near the shore or where the water is not sufficiently deep or it is otherwise undesirable to sink the matter, and transport it to another location in deep water for sequestration using the methods already described above.

Among the embodiments that carry out ex-situ sequestration are those that rely on the same gathering and sequestration methods as those that carry out in-situ sequestration. In cases where the buoyant matter is already on the beach, a beach sweeper is also available for carrying out the gathering procedure.

Distinctions between ex-situ and in-situ systems arise primarily from the need to transport the buoyant matter to the sequestration site and to store the buoyant matter before and during such transport.

Some embodiments rely on storage that is integral to the structure of the vessel that transports the buoyant matter. Other embodiments include those that rely on containers and bins. Yet other embodiments rely on nets. These include closed and opened nuts, surface nets, and submarine nets. Other embodiments rely on a bulk carrier. These include embodiments that rely on towed bulk carriers and embodiments that rely on self-propelled bulk carriers. In both cases, the bulk carrier, which in some cases is a barge, receives the buoyant matter as it is collected and then carries it away when it is full. In some embodiments, the bulk carrier navels along the surface. In other embodiments, the bulk carrier travels underwater.

Other embodiments feature aggregated modular containers. In some embodiments, these are on land, for example on quayside or at a dock. These include nets, bins, and submarine containers. In other embodiments, these are at sea. Examples include anchored towlines for towing nets, a daisy chain of bins, either on the surface or underwater, and a modular floating barge.

In other embodiments, the buoyant matter is accumulated on land prior to being brought to its sequestration site, for example on the dock or quayside. In some these embodiments, the buoyant matter is collected in an open pit or in a large pile. In others of these embodiments, the buoyant matter is collected in an on-land hopper or bin. An example is a structure analogous to a grain elevator but modified to empty into a barge. Other embodiments collect the buoyant matter in a dockside barge. Particular examples of a dockside barge are those that have a flat storage area and those whose storage area is shaped more like a hopper. In yet other embodiments, the buoyant matter is collected in a submarine storage container.

In still other embodiments, the buoyant matter is accumulated at sea prior to being brought to its sequestration site. These embodiments include those in which the buoyant matter is accumulated in a floating pen or cage, similar to those used in fish farms. Other embodiments accumulate the buoyant matter in an anchored barge or submarine storage containers similar to those discussed in connection with land-based accumulation of buoyant matter. Also among the embodiments are those in which the buoyant matter is accumulated in the same container that transports it to the sequestration site.

Other embodiments feature intermediate storage areas or staging areas. In such cases, the buoyant matter would be brought from various points on or near the shore to an accumulation site offshore that functions as a staging area. Barges or similar vehicles then retrieve the buoyant matter and take it to the sequestration site.

Embodiments include those that transport using the same vessel that collects the buoyant matter and those that transport by towing the vessel or container that collects the buoyant matter.

Some embodiments also include a feeding and discharge system. Among these are embodiments that rely on a screw-feeder discharge, embodiments that rely on a conveyor, such as one that includes buckets or rakes, embodiments that rely on through-pumping, in which seawater is continuously admitted and pumped out, as well as those already discussed in connection with the in-situ embodiments.

In another aspect, the invention features a system to intercept floating biomass, to feed biomass to a pump, and to transport it deep below the surface of the ocean in situ. Such a system includes a pump having an inlet device, a discharge device, an inlet hose that leads to the inlet device and a discharge hose that leads to the outlet device. As used herein, "hose" is intended to include any combination of one or more pipes, tubes, and hoses.

In some embodiments, the discharge hose extends from the deployment vessel to a depth of at least fifty to two hundred meters below the ocean's surface.

In some of the foregoing embodiments, the inlet device includes one or more funneling vees or planing structures into which biomass and seawater flows and the pump inlet tube, pipe, or hose extends into the pump inlet device.

In others of these embodiments, the inlet device comprises a sump with a weir below the free surface of the ocean over which the biomass and seawater flows. In these embodiments, the inlet hose extends into the pump inlet device.

In others of these embodiments, the inlet device comprises the pump inlet device that features a suction boom or a hose that has multiple inlet openings distributed along its length. In these embodiments, the inlet hose extends into the pump inlet device.

In others of these embodiments, the inlet device comprises multiple funneling vees and planing structures into which biomass and seawater flows. Among these are embodiments in which the inlet device includes augers of various length, handedness of flighting, and flight design. These augers are made of various materials and are oriented and positioned inside or leading to the inlet hose so as to feed or prevent clogging of the hose. In these embodiments, the inlet hose extends into the inlet device.

Other embodiments include those in which the discharge hose immediately discharges into a hopper or containment vessel onboard the deployment vessel. In such embodiments, a secondary pump or an auger or screw conveyor transports the biomass through a secondary hose to a depth of at least fifty to two hundred meters below the ocean's surface.

In another aspect, the invention feature a pump inlet device that has one or more funneling vees or planing structures into which seawater carrying the biomass flows. Among these are inlet devices that include augers of various length, handedness of flighting, flight design, material, orientation, and positioned inside or leading to the inlet hose that feeds or prevents clogging of the inlet hose or that both feeds and prevents clogging of the pump inlet hose.

Other aspects of the invention feature a pump inlet device comprising a sump with a weir below the free surface of the ocean and aver which seawater carrying the biomass flows.

Still other aspects of the invention feature a pump inlet device comprising a suction boom, a long tube, a pipe, or a hose with multiple inlet openings distributed along its length. Either one of these features is capable of being incorporated into any of the foregoing embodiments.

In another aspect, the collection device features a funneling structure and an open volute that contains a centrifugal impeller that impels biomass and seawater out of the volute through a chute.

Any of the foregoing embodiments can include augers of various length, handedness of flightily, flight design that are made with various materials and oriented and positioned inside or leading to the pump's inlet hose so as to feed the inlet hose or prevent clogging thereof or both.

Another aspect features a system for collecting sargassum from water in near-shore areas or littoral zones. Such a system includes a pump inlet device, a pump, a pump inlet tube, pipe, or hose, and a deployment vessel.

Among these embodiments are those in which the pump discharge tube, pipe, or hose extends to a barge alongside the deployment vessel and those in which the pump discharge immediately discharges into a hopper or containment vessel onboard the deployment vessel. These embodiments can include any of the foregoing pump inlet devices with the pump inlet tube, pipe, or hose extends into that pump inlet device.

Another aspect of the invention features a method for rendering sargassum negatively buoyant by temporarily or irreversibly compromising its pneumatocysts.

Among the practices of this method are those that include subjecting the sargassum to sufficient hydrostatic pressures bye transporting it to a depth of at least fifty meters below the ocean's surface. Practices include those in which the depth is to one hundred meters, those in which it is one hundred and fifty meters, and those in which it is two hundred meters.

Practices of the invention include those that carry out the transport of the sargassum by mechanically pumping sargassum to the depth, those that use an auger or screw to push the sargassum to the required depth through a long tube, pipe, or hose, and those that do so by placing the sargassum inside a negatively buoyant cage.

Some practices carry out passive transport by placing sargassum inside of stagnant water or air for a period of up to three weeks or until the sargassum dies. Other practices include preparing the sargassum by comprising its pneumatocysts. This can be carried out by crushing them between rollers of varying geometry and eccentricity.

Yet other practices include those in which the sargassum is intercepted over a deep area of the open ocean that is already suitable for sequestration of the sargassum as well as those that include colleting the sargassum and transporting it to a suitably deep area of the open ocean, for example by collecting it onto a barge or other storage platform.

In another aspect, the invention features identifying floating biomass mats by predicting a trajectory of the floating biomass' travel and optimizing the paths of one or more ships to intercept the floating biomass.

In yet another aspect, the invention features a method for verifying that one or more vessels has carried out the sinking of floating biomass mats. Such a method relies on a combination of one or more of satellite imaging, video, and seafloor sonography.

In another aspect, the invention features a system to feed floating biomass into a pump and to then use the pump to pump the biomass deep below the surface of an ocean. Such a system includes a deployment vessel, a pump, an inlet structure for the pump, such as a pump inlet tube, an outlet structure for the pump, such as a pump outlet tube, that, when deployed, extends downward to at least fifty meters below the ocean's surface.

Embodiments include those in which the inlet structure is a sump into which the biomass can flow. In these embodiments, the pump inlet tube extends into the sump.

Also among the embodiments are those in which the inlet structure is a funnel into which the biomass can flow. In these embodiments, the pump inlet tube extends into the funnel.

Further embodiments include those in which the inlet structure is an inclined plane that is deployed so that biomass flows under the plane. In these embodiments, the pump's inlet tube extends to the plane's base.

In any of the foregoing embodiments, it is useful to provide a motorized auger in the pump inlet tubes.

In another aspect, the invention features a method for rendering sargassum negatively buoyant by temporarily or irreversibly compromising its pneumatocysts.

Among the practices of this method are those that include subjecting sargassum to sufficient hydrostatic pressures by mechanically pumping sargassum to a depth below the ocean's surface that is below a critical depth. In some practices, the critical depth is fifty meters.

Also among the practices of the method are those in which interception and pumping of sargassum occur more or less continuously at around the same location. This would include intercepting the sargassum over deep areas in the open ocean and then pumping it deep below the surface.

In other cases, the sargassum is gathered at a location that is perhaps unsuited to disposal, for example because the ocean is insufficiently deep. In such cases, the method includes first pumping the sargassum into a barge or other storage platform and transporting it to a deep region of the ocean before pumping it below the ocean's surface to the critical depth.

In another aspect, the invention features a system to collect floating biomass for transport to the open ocean for later pumping to a depth below the ocean that is sufficient to confer negative buoyancy to the biomass. Such a system features an inlet structure, a pump, a pump inlet tube, a receiving vessel capable of being transported to a far offshore site aver deep ocean, and a pump outlet tube cap of discharging into the receiving vessel.

In some embodiments, the pump has an outlet that connects to a tube that, when deployed, extends at least to a critical depth below the ocean surface. Among these are embodiments those in which the critical depth is one hundred meters, those in which it is one hundred and fifty meters, and those in which it is two hundred meters.

In another aspect, the invention features an apparatus for sequestering seaweed in a body of water. Such an apparatus includes means for changing buoyancy. Thee means for changing buoyancy causes the seaweed to transition from having a positive buoyancy to a negative buoyancy.

Among the embodiments are those in which the means for changing buoyancy is configured to transport the seaweed to below a critical depth in the body of water, the critical depth being below a depth at which the seaweed undergoes the transition and also below a mixed layer in the body of water. Also among the embodiments are those in which the critical depth exceeds one-hundred and those in which it exceeds one-hunched and fifty meters.

In some embodiments, the means for changing buoyancy comprises a pump and a hose. In operation, the hose extends to below a critical depth, the critical depth being a depth that ensures that, as a result of having undergone the transition, the seaweed will remain below a mixed layer of the body of water.

In other embodiments, the means for changing buoyancy comprises a weighted cage that pushes the seaweed to a critical depth, the critical depth being a depth that ensures that, as a result of having undergone the transition, the seaweed will remain below a mixed layer of the body of water.

Among the embodiments are those that include means for gathering the seaweed that is to be provided to the means for changing buoyancy. Among these are embodiments in which the means for gathering includes a purse seine configured for gathering the seaweed for feeding the means for changing buoyancy.

Also among the embodiments are those that include means for feeding seaweed the means for changing buoyancy. Among these are embodiments having an inlet to the means for changing buoyancy, the inlet comprising an auger for driving the seaweed towards the means for changing buoyancy.

Also among these embodiments are those that include a wave-following crane coupled to an inlet to the means for changing buoyancy. In these embodiments, the wave-following crane, as a result of being coupled to the inlet causes the inlet to maintain a constant depth below the water's surface.

In additional embodiments, the means for feeding includes a boom having apertures. The apertures are in communication with a low-pressure region such that seaweed is drawn through the apertures and propelled toward the means for changing buoyancy.

Some embodiments also include a container that receives the seaweed and carries the seaweed through the body of water to a location at which sequestration takes place. Among these are embodiments that include a barge and a conveyor. The barge carries the seaweed in a cargo space and the conveyor, which extends along a floor of the cargo space, carries seaweed being carried by the barge to the buoyancy-changing means. Also among these embodiments are those in which a floating hopper carries the seaweed. The hopper includes portholes for admitting seawater into the hopper to form a slurry containing the seaweed. A extends through the slurry for conveying the slurry to the means for changing buoyancy.

In another aspect, the invention features a method for sequestering seaweed b causing it to undergo a transition from positive to negative buoyancy.

Amon the practices of the method include those in which causing the seaweed to undergo the transition comprises transporting the seaweed to below a critical depth in a body of water. The critical depth is below the water body's mixed layer and below the depth at which the seaweed attains neutral buoyancy.

Also among the embodiments are those that include selecting the seaweed to be sargassum.

A variety of ways are available to transport the seaweed past the critical depth. These include pumping the seaweed below the critical depth and pushing the seaweed below critical depth.

Yet other practices of the method include transporting the seaweed from a first location, for example, in a littoral zone, to a second location and then causing the seaweed to undergo the transition at the second location.

In some embodiments, the sargassum is directed in-situ, by one of various funneling or booming techniques, into the intake of a centrifugal or axial flow pump, the output of which is connected to a hose or pipe that projects either into a container for collection, transport, and later pump-to-depth, or that projects into a pump that pumps it directly down to a critical depth at which the sargassum will keep sinking, on its own, to the bottom of the ocean.

In other embodiments, augers and/or screw conveyors of various designs and orientations (transverse and/or co-axial with the pump/suction inlet) controllably feed pump inlets to prevent clogging and optimize feed efficiency. Among these designs and orientations are those in which the augers and/or screw conveyors are transverse to the pump/suction inlet and those in which the augers and/or screw conveyors are coaxial with the pump/suction inlet.

In yet other embodiments, spring-loaded containment, serration/interrupted flighting, and/or compliant materials prevent the wedging of jetsam, flotsam, or other floating matter in auger flighting.

Among the embodiments are those in which auger systems deliver the material collected to sharp blades. These blades reduce the size of individual solids entering the collection pumps.

Also among the embodiments are those in which seawater and sargassum flow over a weir at a prescribed depth. Such control over depth promotes direct suction at the surface, which is where the sargassum most heavily concentrated. Such control promotes the ability to collect the sargassum and to meter its flow into a pump inlet. In particular, the use of such a weir permits concentration of sargassum entering the pump to be controlled by controlling the prescribed depth.

Some embodiments feature a sump that follows wave motion. Among these are embodiments in which it does so as a result of free-floatation. In others, it does so as a result of a linear and/or rotary 1-2 degree of freedom system with appropriate hydrostatic preload, stiffness, and damping to keep the sump weir at an appropriate depth below the free surface of the water. This ensures that the sump does not run dry and that the sump provides a consistently high solid concentration to the pump inlet in a wide range of sea states and headings.

In other embodiments, a long suction hose/pipe with inlets distributed along its width/length/circumference acts as both a suction device and a collection boom. Because such a hose or pipe is able to support a much higher flow rate by collecting over a larger area, it enables the utilization of pumps with very high flowrates.

Further embodiments include a conveyor mechanism to collect and transfer sargassum out of the water and into a container, pump inlet, or rolling crusher inlet.

Some embodiments use a solid funnel or wire/cable/string that has been woven into a funnel frame immediately around the suction inlet to reduce leakage and to improve suction feed efficiency. These embodiments include those in which the funnel comprises various configurations that are designed to achieve one or more of concentrating, planing, and scooping. Among the funnel configurations are those that are vertical and those that are hybrid.

Also among the embodiments are those having a vacuum with the various inlet devices. Such a vacuum promotes collection of sargassum. The sargassum is discharged from the vacuum into a container from which it is later pumped into the deep ocean for sequestration.

Also among the embodiments of the invention are those that carry out large-scale management of sargassum removal. These include embodiments that rely on satellite imagery in combination with Lagrangian particle tracking models to optimize the path of ships performing the collection of sargassum. Such embodiments also include those that rely on Benthic current modeling to predict the final resting place of sunken sargassum.

Also among the embodiments that early out such large-scale management are those that carry out verification steps to ensure that sargassum has been collected and sunk by a fleet of ships at appropriate locations and to sufficient depth. Such verification steps are carried out by relying on information acquired from one or more of a variety of sources. These sources include satellite imagery (visible and or NIR), video surveillance, and sonar survey.

Some practices of the invention feature separating collection and sinking activities such that, for example, sargassum is collected near shore and then transported to the open ocean to be sequestered.

Among such practices are those that rely in part on a special barge that is capable of storing collected sargassum, transporting it to sufficiently deep water, and discharging or otherwise feeding it to a system that executes one of the aforementioned sequestration methods. In some embodiments, the barge is fully integrated with equipment such that it can be towed by any ordinary tug/mover. In other embodiments, the barge has its own propulsion ability.

A useful feature in some embodiments is a hopper with hopper walls. In some embodiments, the hopper walls are designed for mass flow of sargassum. Embodiments of barges include those that have a fully live or partially live screw feed at bottoms thereof for discharging sargassum and feeding it to a pump that executes the pump-to-depth procedure for sequestration of the previously collected, stored, and transported sargassum.

Further embodiments include those in which seawater continuously enters the barge, either, passively, for example by being allowed to pass through a porthole, or actively, by being pumped. In these embodiments, seawater entry and pumping the sargassum and seawater mixture out of the barge to the critical depth occur simultaneously.

Embodiments of the invention include those that rely on a variety of different vessels for deployment of the aforementioned gathering, feeding, and pumping systems. These include such vessels as stern-deck boats (e.g., oilfield utility boats, crew boats, tugs, etc.) and bow-deck boats (e.g., landing craft ships, self-unloading ships, etc.).

Embodiments that are intended to collect, store, and/or transport sargassum in shallow waters include those that rely on catamaran or trimaran barges, deck utility boats, and/or other low-draft stern-/bow-deck boats to deploy the aforementioned pump inlet devices.

Some embodiments and practices rely on specialty hybrid boats that can collect, store, transport, discharge/feed, and sequester sargassum. Among these are boats that use independent, interchangeable systems. These embodiments enable sequestration in-situ or ex-situ with the initial collection.

Among the hybrid vessels in the foregoing embodiments is a catamaran that uses its hulls as funneling structures for gathering sargassum. In some embodiments, the catamaran comprises a reconfigurable member between the hulls that can act as a conveyor for collection and later sequestration. This is achieved by pitching it down so that its front edge, which is in the water, meets the water at a negative angle of attack. Alternatively, the member can then be configured as a planing pump inlet for immediate sequestration. This is carried out by tipping it up so its back edge, instead of its front edge, is in the water. In this case, the back edge meets the water at a positive angle of attack.

Some embodiments and practices described herein cause the sargassum to sink to depths in excess of a kilometer, effectively removing the sargassum from the photosynthetic layers of the ocean.

Also among the embodiments and practices described herein are those that intercept the sargassum over waters that are deep enough such that intrinsic carbon or any greenhouse gases (GHGs) resulting from any decomposition will, as a practical matter, not rise to the surface. Instead, they would become, for example become frozen hydrates or remain dissolved in the deep ocean waters without being transported back to the surface by ocean currents or oceanic food chains.

One or more embodiments may have advantages including the following.

Sinking carbon content present in the sargassum deep in the ocean avoids landfill/coastal methanogenesis and increases the overall biological pumping capacity of the Caribbean. SOS thus provides a new method of carbon reduction/offsetting with great potential (on the order of hundreds of millions of tons of carbon dioxide equivalent per year).

After having been pumped to depth, the sequestered sargassum will remain in stasis for eons, thereby effectively sequestering the carbon it has absorbed from the atmosphere and the excess nutrients and heavy metals from oceans polluted by human activities.

As a result of having sequestered the sargassum in deep waters, intrinsic carbon or any greenhouse gases (GHGs) that are given off as a byproduct of decomposition will face considerable difficulty in rising to the surface. As a practical matter, such gases would become frozen hydrates or remain dissolved in the deep ocean waters without being transported back to the atmosphere by ocean currents or oceanic food chains.

Other features and advantages of the invention are apparent from the following description, and from the claims.

DETAILED DESCRIPTION

1 Overview

Figure 1:
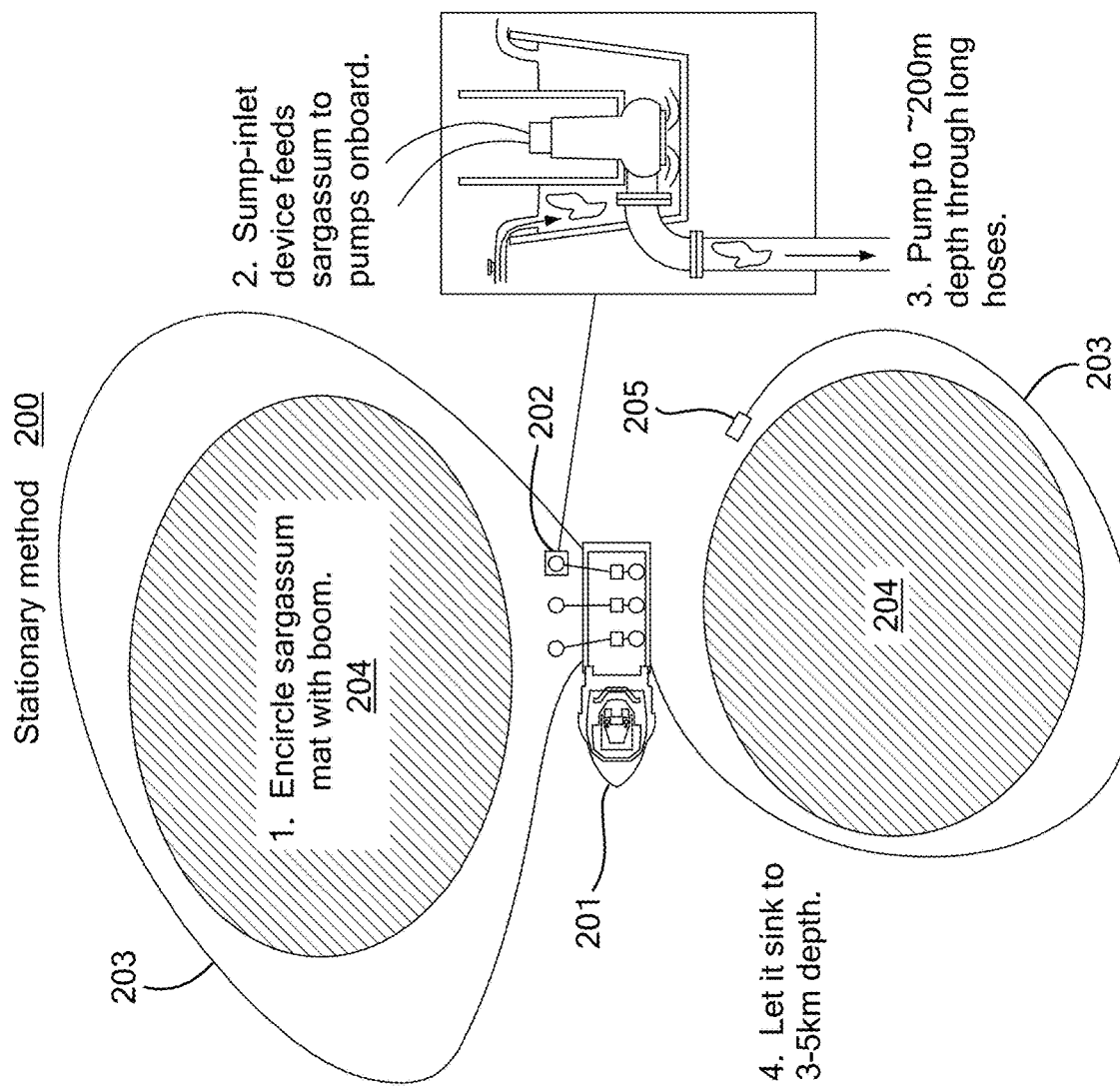
FIG. 1 shows two methods for collecting sargassum mats and windrows in the ocean—a moving method 001 and a stationary method 002—and in-situ sinking said sargassum to achieve Sargassum Ocean Sequestration of Carbon (SOS-carbon). The moving method 001 comprises one of the various inlet devices is being pushed through a mat of sargassum, and the stationary method 002 comprises one of various inlet devices being fed by pulled booms encircling mats of sargassum. The moving method may be assisted by the use of a J-boom, wherein the J-apex is attached to the SOS vessel and/or inlet device and the distal end is towed ahead of the SOS vessel (or held passively by a boomvane), through a mat of sargassum, such that a large swathe of sargassum is funneled towards the inlet device(s).
Figure 1:
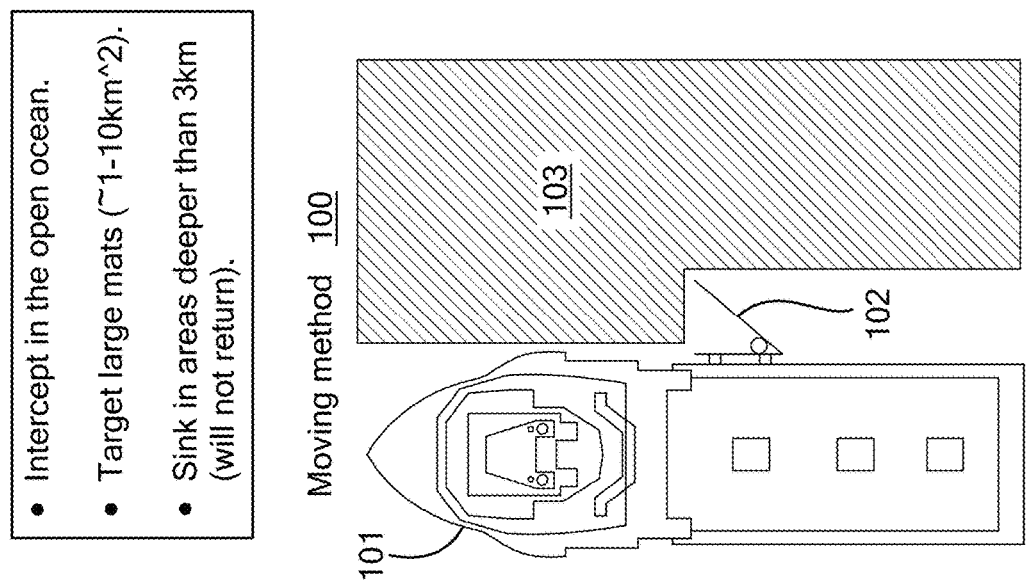
Figure 2:
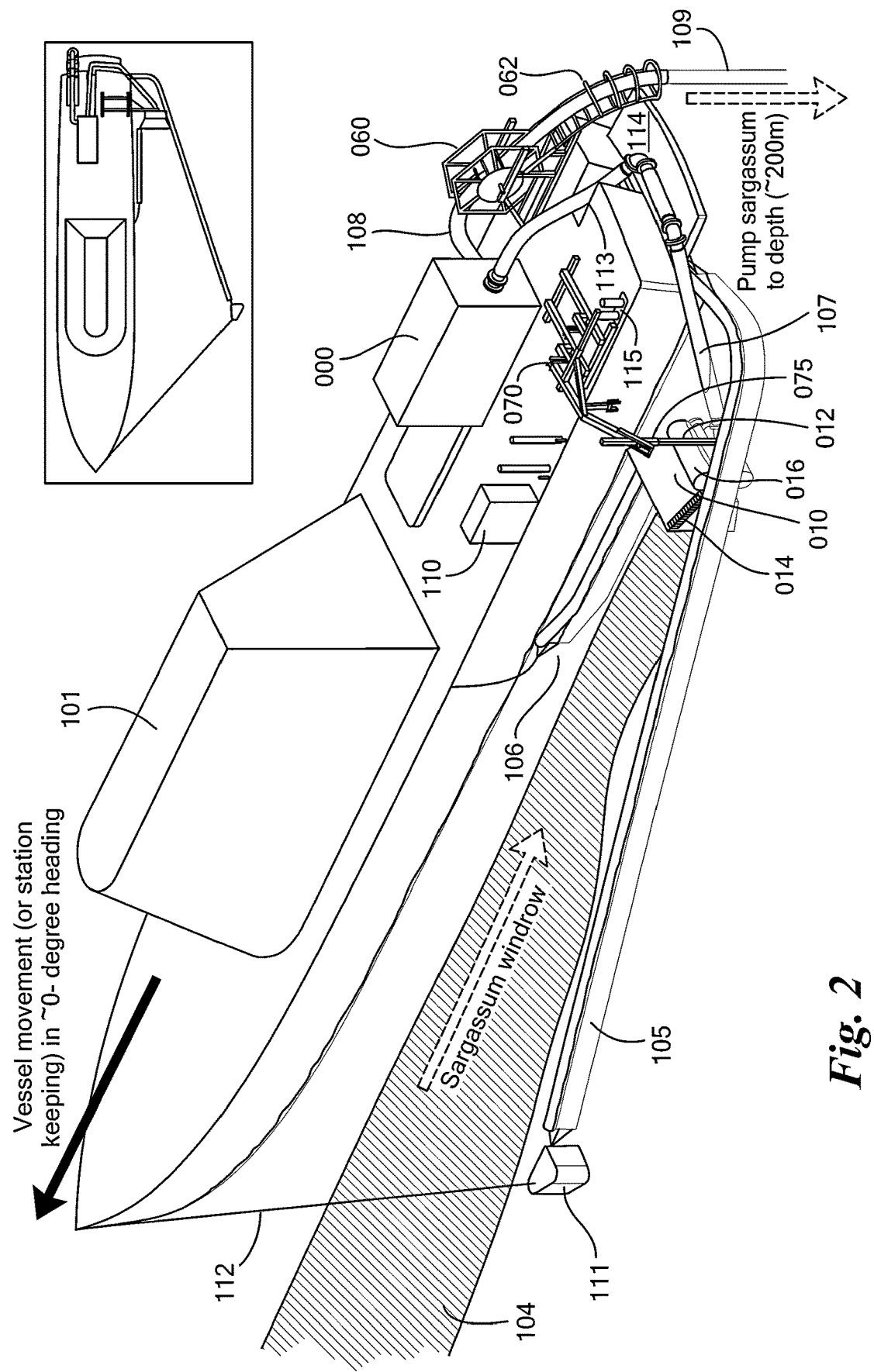
FIG. 2 shows the preferred embodiment of a system 100 for implementing the moving method for collecting sargassum mats and windrows in the ocean from FIG. 1

One example of an approach referred to herein as "Sargassum Ocean Sequestration of carbon" (SOScarbon) in intercepting sargassum far from shore and permanently sinking it to the deep ocean floor. An implementation is shown in FIGS. 1 and 2 and comprises in-situ pump-to-depth (IPD) wherein sargassum is intercepted offshore and over deep water (at least 500 m) where it is continuously pumped.

The present invention comprises several methods and mechanisms for sequestering sargassum in the deep ocean. Hereafter, preferred embodiments among the many possible system permutations are described.

The primary method of the present invention is called "pump(ing)-to-depth", wherein sargassum is permanently sequestered in the deep ocean by pumping it to a minimum critical depth in the ocean (150-200 meters; the depth at which sargassum becomes negatively buoyant has been found to be at least 50-100 m through various experiments in which sargassum was lowered, while being videoed, inside of an open-bottom cylinder) where the hydrostatic pressure is enough to sufficiently compress sargassum pneumatocysts (the grape-like bladders responsible for sargassum's buoyancy) such that the entire macroalgae is rendered negatively buoyant and continues sinking on its own (without any further intervention). It is important to note that pumping sargassum to said critical depth (150-200 meters) does not irreversibly compromise sargassum pneumatocysts or permanently compromise its buoyancy. Rather, it sufficiently compresses the pneumatocysts so that the sargassum becomes negatively buoyant below the said critical depth. However, if sargassum previously pumped-to-depth was somehow returned above the critical depth, it may become positively buoyant again. Sargassum pneumatocysts are like underinflated balloons, buckling before they burst. Because of this, irreversibly rupturing sargassum vesicles requires a much greater depth than said critical depth (150-200 meters), making it mechanically and energetically unfeasible. Therefore, a critical feature of the pump-to-depth method is that said critical depth (150-200 meters) for pumping to depth also exceeds the mixed layer of the Caribbean (usually 90-110 m) so that sargassum cannot be carried back up to a depth where it becomes positively buoyant again. Ideally, pumping-to-depth will, furthermore, be performed in locations where the depth of the oceans exceeds one kilometer, but preferably three kilometers, such that when sargassum pumped to the critical depth (150-200 meters) sinks, on its own, and reaches the bottom of the ocean, its carbon will be essentially permanently sequestered. Hereafter "SOScarbon" ("sargassum ocean sequestration of carbon") will be used to refer collectively to the pump-to-depth method and/or all systems used to execute said method, described hereafter.

SOScarbon system embodiments generally fall into two categories: in-situ systems and ex-situ systems. In "in-situ" systems, sargassum is intercepted offshore, anywhere deep enough for pumping-to-depth (at least 250 m depth is recommended) and immediately sequestered via pumping-to-depth. By contrast, in "ex-situ" systems, sargassum is first collected along barriers or in in other areas where it is not feasible to pump-to-depth, and then transported to an appropriate location for sequestration via pumping-to-depth. In-situ systems have the advantage they require no handling/transportation of sargassum, however bathymetry and other conditions may not always permit in-situ pumping-to-depth. In the current paradigm of sargassum management, wherein sargassum is collected on or near beaches, ex-situ systems could be immediately useful. Both types of systems share many of the same mechanisms, ex-situ systems comprising additional methods and mechanisms for transporting sargassum and feeding the subsequent pump-to-depth process.

The in-situ pump-to-depth version of SOScarbon has two preferred embodiments, distinguished base on how the systems "feed" on a mat or windrow of sargassum in the open ocean—one using a moving method and the other using a stationary method. These methods are both shown in FIG. 1. In FIG. 1, a moving vessel 101, equip with a generic suction inlet device 102, feeds on the edge of a sargassum mat/windrow 103, and pumps-to-depth immediately. Also in FIG. 1, a stationary vessel 201, equip with generic suction inlet devices 202 and multiple booms 203 being pulled around sargassum mats/windrows 204 by a secondary vessel 205, is fed by pulling (reeling in) booms 203, gathering sargassum mats/windrows 204 near its suction inlet devices 202, and pumps-to-depth immediately.

Note that the moving method 100 of FIG. 1 only requires that there is relative motion between the SOScarbon vessel 101 and the sargassum mat/windrow 103. The vessel 101 could be motoring in any direction or merely station-keeping in ~0-degree heading as sargassum mat/windrow 103 moves towards the vessel 101. The moving method may also deploy multiple suction inlet devices 102 in parallel and/or from both sides of the vessel 101, perhaps also using J/U/V-booms to further extend the collection width on either side (as shown in the later more detailed embodiment of method 100 in FIG. 2). To eliminate the entire sargassum mat/windrow 103, the vessel 101 may use multiple passes in the same direction relative to the direction of ocean current, use a rastering pattern in multiple directions, or feed along the outer contour of the mat/windrow 103 in a cyclical fashion. No matter the path taken to completely eliminate the sargassum mat windrow 103, the vessel 101 may choose to use the ocean current to its advantage by motoring when moving with the ocean current and station-keeping (or motoring slower) when moving against the ocean current. This is order to both save fuel and also with the goal of maintaining a constant, relative, normal (orthogonal) velocity between the suction inlet device 102 and the seawater/sargassum at the ideal value for system operation (currently found to be ~1 knot in practice) and to reduce acute and/or cyclical loads on equipment deployed. Many more complicated feeding patterns may be developed to save fuel (minimize distance and propulsion power) and optimize suction inlet devices 102 performance. It is recommended that the vessel 101, utilizing the moving method 100 of feeding, not exceed a relative velocity with respect to the ambient seawater of more than 3 m/s (~6 knots). In practice, it has proven better to stay as close as possible to 0-degree or 180-degree heading wide respect to ocean waves/current in order to reduce the rolling of the vessel 101 and improve the performance of the suction inlet devices 102. In practice, is has proven better to keep the suction inlet devices slightly in the "wave shadow" of the vessel 101, whenever possible, to reduce the heaving forces on the suction inlet devices 102 (it is obviously not possible to keep all suction inlet devices 102 in the wave shadow of the vessel 101 when suction inlet devices 102 are deployed from both sides of the vessel 101).

Note that the stationary to method 200 of FIG. 1 could encircle sargassum mat/windrows 204 by either the secondary vessel 205 towing the booms 203 around the sargassum mats/windrows 204 (similar to a purse seine fishing vessel except the seine net is replaced by the booms 203) or the vessel 201 could pull the booms 203 around the sargassum mats/windrows 204 itself, perhaps using floating anchors (devices that act like underwater parachutes), conventional anchors (depending on the depth of the water), or a secondary vessel 205 to anchor the opposite end of the booms 203 (note the vessel 201 would not be able to pull out multiple booms 203 without the help of the secondary vessel 205). If a secondary vessel 205 is used to any extent, it could comprise one of a number of vessels (i.e., rib boats with outboard motors or towing catamarans for towing oil booms at present), so long as it has the capacity to tow the booms 203 (at least 500 hp). The booms 203 could be 100 m to three kilometers in length using current boom/lay-flat hose reels (for deployment/recollection), allowing the encirclement of a sargassum mats/windrows 204 close to a square kilometer in area (given that it is roughly circular or, if in an elongated windrow, first concentrated using the booms 203 as J/U/V-booms that move relative to the sargassum). The booms 203 could be even longer if they are stored on and deployed from a coiling pad (similar to those used for storing and dispensing underwater cable from cable laying vessels). The booms 203 could be of various design (fence, solid floatation, self-inflating, etc.), the simplest being a normal solid floatation round oil containment boom with a solid skirt (perhaps with the modification that the skirt is made pervious to allow water, but not sargassum, to pass) with the basic requirements that it be capable of operation in the intended sea state so as to avoid bridging, arching, overtopping, and/or submergence failure (although boom selection can become much more complicated—taking into consideration the shape of the buoyant member, coatings on the skirt, the attachment method of the ballast, etc.). It is recommended that the booms 203 be pulled in (using the storage reel/coiling pad) at 0.5 to 2 meters per second (this is linear speed along the length of the booms 203). Because the rate of change of area encircled by the booms 203, as they are pulled in, decreases linearly with the decrease in length of the booms 203 still in the water the pulling speed of booms 203 may be increased during the pulling process in order to maintain a constant feed rate of sargassum into the suction inlet devices 202. Because the sargassum encircled by the booms 203 can be concentrated 5-10 times during the pulling process, it is recommended that the booms 203 have skirts 1-2 meters in length and freeboard of 0.15-0.3 meters (sargassum is only weakly buoyant so as it is concentrated most of the increased thickness will remain underwater—generally there will be 10:1 submerged to unsubmerged thickness). Note also that the booms 203 could also be actual purse seine nets and the vessel 201 could be a purse seiner vessel.

The vessels 101 and 201 could be of various design so long as there is deck space, capacity, and adequate faculties for maneuverability (DP2 station-keeping ability recommended) and deployment of system components; the vessels 101 and 201 could be of stern-deck or bow-deck design. This is particularly advantageous for an entity operating an SOScarbon system because the ability to quickly install and uninstall SOScarbon systems on many different vessels means that vessels 101 and 201 could be rented only during "sargassum season", being allocated to other work during periods when sargassum is not threatening beaches.

Note that the suction inlet devices 103 and 202 of FIG. 1 are generic and not meant to be detailed representations of devices to be used in preferred embodiment of systems for executing methods 100 and 200. Immediately following is a description of preferred embodiments of systems for executing methods 100 and 200, followed by detailed descriptions of several pump inlet devices.

The overall, preferred SOScarbon system embodiment for accomplishing pumping-to-depth via moving method 100 is shown in FIG. 2, wherein sargassum windrow 104 is intercepted offshore, in a location appropriate for pumping-to-depth (at least 250 meters deep) where funneling booms 105 and 106 direct it towards a transverse auger suction inlet 010 (which is shown instead of the generic suction inlet device 102 from FIG. 1), which meters the flow of solids into a 12-inch pump suction hose 107. 12-inch pump suction hose 107 leads to 12-inch, 5000 GPM pump 000, which discharges into 12-inch pump discharge hose 108. 12-inch pump discharge hose 108 is connected to a 12-inch, 200 meters lay-flat discharge hose 109 through an integral fitting in a hose reel 060, which deploys and recollects said 12-inch, 200 meters lay-flat discharge hose 109. The 12-inch, 200 meters lay-flat discharge hose 109 is deployed over a curved roller conveyor 062, and extends vertically downward to/past the critical depth of 150-200 meters. When sargassum is discharged from the end of 12-inch, 200 meters lay-flat discharge hose 109 at/below said critical depth of 150-200 meters, sargassum pneumatocysts are sufficiently compressed such that the entire macroalgae is rendered negatively buoyant and continues sinking to the bottom of the ocean. The said critical depth also exceeds the mixed layer of the Caribbean (90-110 meters) so it cannot be carried back to a depth where it may become positively buoyant again.

The rear end of funneling boom 105 is secured to the stem of the vessel 101, and the forward end is attached to a boomvane 111, which is in turn attached to the bow of vessel 101 via bowline 112. The boomvane 111 has submerged foils that generate an outboard, opening force when seawater passes through them, which pulls the forward end of funneling boom 105 away from the vessel 101, providing a large collection width for feeding on the sargassum windrow 104 (this permits the vessel 101 to travel slower, saving fuel and reducing stress on equipment, while still feeding large quantities of sargassum to transverse auger suction inlet 010). The side of funneling boom 105 seals against the solid funnel 014 of transverse auger suction inlet 010. The rear end of funneling boom 106 is attached to, and creates a seal with, the inboard side of the solid funnel 014 of transverse auger suction inlet 010. The forward end of funneling boom 106 is attached to, and creates a seal with, the port side of vessel 101. In order to achieve a solids concentration of ~50% (by bulk volume) in the pumped sargassum-seawater mixture, with a total pumped flowrate of 5000 GPM and a relative forward speed of 0.1 meters per second, and assuming the bulk thickness of incoming sargassum is 0.1 meter thick, the funneling boom 105 can be 30 meters long and inclined at 30 degrees from the sagittal/median plane of the vessel 101, to provide a collection width of 15 meters.

The transverse auger suction inlet 010 is deployed from the port side of vessel 101 using crane 070. The transverse auger suction inlet 010 is held by a post 012, which is inserted into combined rotary-linear, 2 degree of freedom, passive joint 075 of crane 070. The post 012 is retained inside passive joint 075 of crane 070 with a set of high-strength pins inserted through the patterned holes in said post 012. The passive joint 075 rotates freely and allows the post 012 to slide inside its linear degree of freedom. Because the transverse auger suction inlet 010 is preloaded on the water surface by its own weight and a number of floatation tanks 016, the transverse auger pump inlet 010 can reliably wave follow to keep the inlet opening of the 12-inch pump suction hose 107 at a constant depth below the free surface, despite incident waves. This is a critical functionality of all the inlet devices described herein, because it the 12-inch pump suction hose 107 repeatedly comes out of the water and aspirates, the 12-inch, 5000 GPM pump 000 will lose suction and constantly have to re-prime, essentially bringing the pumping-to-depth process to a halt.

While the system embodiment contained in FIG. 2 for executing pumping-to-depth method 100 is shown with transverse auger suction inlet 010 outriggered from the vessel 101, the transverse auger suction inlet 010 could be alternatively pushed in front of and/or towed behind vessel 101, at the apex of a U-boom instead of the funneling boom 105.

Figure 3:
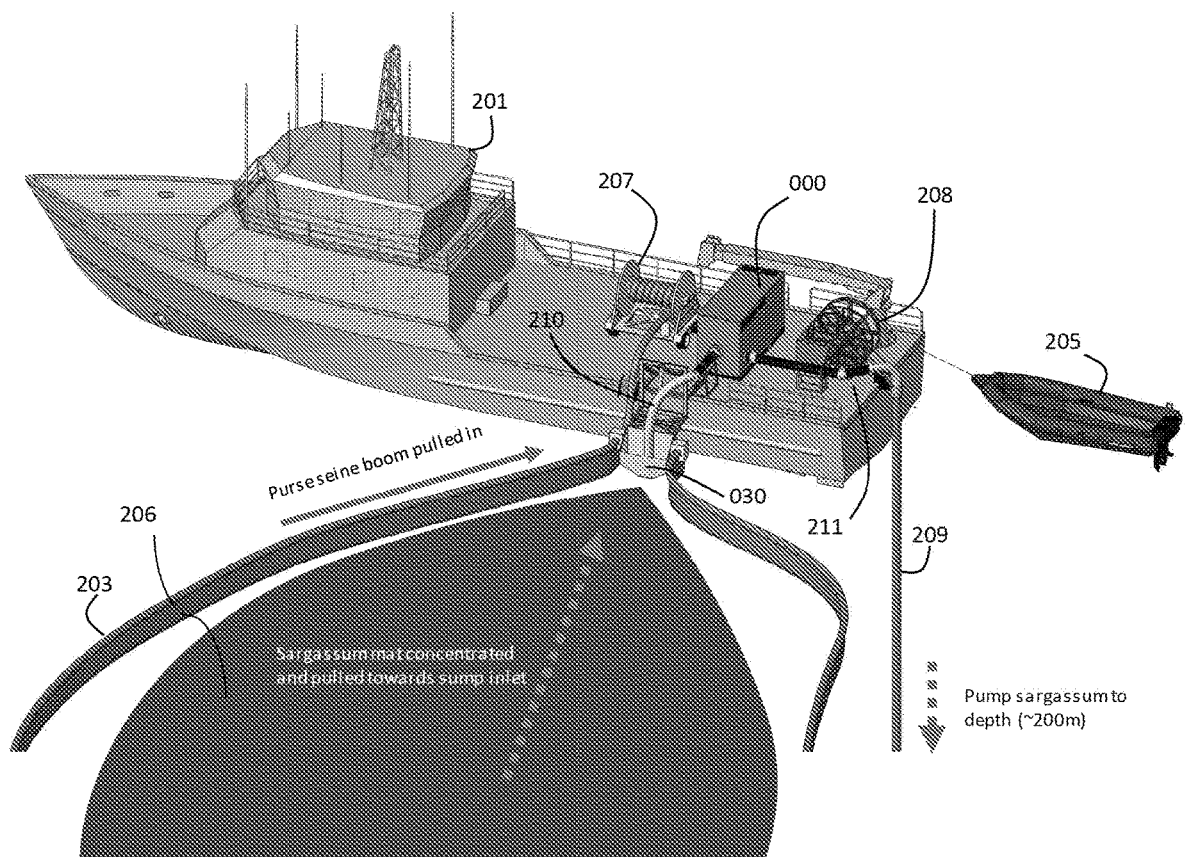
FIG. 3 shows the preferred embodiment of a system 200 for implementing the stationary method for collecting sargassum mats and windrows in the ocean from FIG. 1

The overall, preferred SOScarbon system embodiment for accomplishing pumping-to-depth via stationary method 200 is shown in FIG. 3, wherein sargassum mat 206 is intercepted offshore, in a location appropriate for pumping-to-depth (at least 250 meters deep), encircled by boom 203 and pulled in (by boom storage reel 207), toward sump suction inlet 030 (which is shown instead of the generic pump inlet device 202 from FIG. 1), which meters sargassum into 12-inch pump suction hose 210. 12-inch pump suction hose 210 leads to 12-inch, 5000 GPM pump 000, which discharges into 12-inch pump discharge hose 211. 12-inch pump discharge hose 211 is connected to a 12-inch, 200 meter lay-flat discharge hose 209. The 12-inch, 200 meter lay-flat discharge hose 209 extends vertically downward to/past the critical depth of 150-200 meters. When sargassum is discharged from the end of 12-inch, 200 meter lay-flat discharge hose 209 at/below said critical depth of 150-200 meters, sargassum pneumatocysts are sufficiently compressed such that the entire macroalgae is rendered negatively buoyant and continues sinking to the bottom of the ocean. The said critical depth also exceeds the mixed layer of the Caribbean (90-110 meters) so it cannot be carried back up to a depth where it may become positively buoyant again. Note that generic hose reel 208 shown in FIG. 3 could be replaced by hose reel 060 shown in FIG. 2 and the 12-inch, 200 meter lay-flat discharge hose 209 could be deployed/recollected from said hose reel 060, over the curved roller conveyor 062.

The overall, preferred SOScarbon system embodiment for accomplishing pumping-to-depth via stationary method 200 is shown in FIG. 3, wherein sargassum mat 206 is intercepted offshore, in a location appropriate for pumping-to-depth (at least 250 meters deep), encircled by boom 203 and pulled in (by boom storage reel 207), toward sump suction inlet 030 (which is shown instead of the generic pump inlet device 202 from FIG. 1), which meters sargassum into 12-inch pump suction hose 210. 12-inch pump suction hose 210 leads to 12-inch, 5000 GPM pump 000, which discharges into 12-inch pump discharge hose 211. 12-inch pump discharge hose 211 is connected to a 12-inch, 200 meters lay-flat discharge hose 209. The 12-inch, 200 meters lay-flat discharge hose 209 extends vertically downward to/past the critical depth of 150-200 meters. When sargassum is discharged from the end of 12-inch 200 meters lay-flat discharge hose 209 at/below said critical depth of 150-200 meters, sargassum pneumatocysts are sufficiently compressed such that the entire macroalgae is rendered negatively buoyant and continues sinking to the bottom of the ocean. The said critical depth also exceeds the mixed layer of the Caribbean (90-110 meters) so it cannot be carried back up to a depth where it may become positively buoyant again. Note that generic hose reel 208 shown in FIG. 3 could be replaced by hose reel 060 shown in FIG. 2 and the 12-inch, 200 meter lay-flat discharge hose 209 could be deployed/recollected from said hose reel 0601 over the curved roller conveyor 062.

In the system embodiments contained in FIGS. 2 and 3 for executing pumping-to-depth methods 100 and 200, respectively, all connections between 12-inch pump suction hose 107 and 210 segments, 12-inch pump discharge hose 108 and 211 segments, 12-inch 5000 GPM pump 000, hose reel 060 and 12-inch 200 meter lay-flat discharge hose 109 are made with 12-inch camlock or Victaulic groove clamps and secured to the vessels 101 and 201 with chain and/or ratchet straps. It is recommended that the 12-inch pump suction hose 107 and 210 segments and the 12-inch pump discharge hose 108 and 211 segments be lightweight, flexible hose (Kanaflex hose, for example, makes hoses reinforced radially by a metal helices that maintain bending compliance) and have swiveling camlock connections between them (using O-rings on spherical ends). The bendability afforded by these features helps with the deployment of the suction inlet devices 010 and 030 (which requires manipulation of the attached 12-inch pump suction hose 107 and 210 segments) and helps with making the other necessary onboard connections during deployment (connecting the 12-inch pump discharge hose 108 to the hose reel 060, for example). All equipment—crane 070, hose reel 060, and 12-inch, 5,000 gallon-per-minute pump 000—are secured to the deck of vessel 101 using 4ea ⅞" high-strength pins on each. The pins penetrate 1" pinholes in the base of the equipment and 1" pinholes in pairs of pad eyes that straddle each pin location. The said pairs of pad eyes are welded directly to the deck of vessels 101 and 201. The 12-inch, 200 meter lay-flat discharge hoses 109 and 209 are ballasted by weighted segment(s) of pipe (for example 3ea 0.5 meter-long, 12-inch, schedule 120 steel pipe totaling 300 kilograms) that are attached to the end of the 12-inch, 200 lay-flat discharge hoses 109 and 209 and to each other, end-to-end, with 12-inch Victaulic groove clamps. Said weighted segment(s) of pipe allow sargassum to discharge through them (after tray traveling down the 12-inch, 200-meter lay-flat discharge hoses 109 and 209) and sufficiently weight the 12-inch, 200-meter lay-flat discharge hoses 109 and 209 so as to prevent the 12-inch, 200-meter lay-flat discharge hoses 109 and 209 from swaying such that the bottom of the hose raises above the critical depth (150-200 meters). The hose weights also prevent the 12-inch, 200-meter lay-flat discharge hoses 109 and 209 from vibrating (due to Von Karman), whipping, and/or twisting.

Note that in the system embodiments contained in FIGS. 2 and 3 for executing pumping-to-depth methods 100 and 200, respectively, the system layouts are particular for vessels 101 and 201. In FIG. 2, for example, the layout of 12-inch pump suction hose 107 makes use of the dive deck 114 and the stairway 113 (on the stern of vessel 101) to avoid a bollard 115 (which the 12-inch pump suction hose 107 might otherwise catch on during deployment of transverse auger pump inlet 010). This layout of 12-inch pump suction hose 107 also allowed it to remain attached to the 12-inch 5,000 gallon-per-minute pump 000 suction at all times (rather than detaching/reattaching it from the 12-inch 5,000 gallon-per-minute pump 000 every time the transverse auger suction inlet 010 is retracted/deployed using the crane 070). Additionally, assuming vessels 101 and 201 are repurposed for use as SOScarbon vessels, small modifications may be possible while retrofitting (like cutting railings and pad eyes), critical infrastructure cannot be moved. For example, the crane 070 in FIG. 2 needed to be placed such that it avoided the obstacle 110 on the portside of the ship, which was a critical engine room exhaust.

The 12-inch 5,000 gallon-per minute pump 000 illustrate both FIGS. 2 and 3 is generally representative of an end-suction/centrifugal pump made by Godwin, a Xylem Inc. brand, that makes critically-silenced, skid-mounted, automatic self-priming, integrated diesel, 5,000 gallon-per-minute, dewatering/wastewater pumps, called DPC300. These pumps are ideal for the scale of systems depicted in FIGS. 2 and 3 because they are a manageable size (6500 lbs with a 1.5 meter×4.5 meter footprint), skid mounted (easy to transport, lift, and secure to deck), easy to use (boasting a fairly generous operating range), have an open vane impeller design appropriate for solids-handling. These pumps are offered primarily through rental contracts for dewatering and wastewater projects around the world. Renting the pump-to-depth pumps 000 in addition to the vessels 101 and 201 enables SOScarbon operators to essentially eliminate costs whenever sargassum is not threatening beaches by returning pumps 000 and vessels 101 and 201 back to owners during these periods. It is recommended that a solids-handling pump with self-priming capability be used because the pumps will likely be mounted onboard the vessels 101 and 201 in most cases.

Note that the 12-inch 5,000 gallon-per-minute pump 000 could have also been axial flow instead of centrifugal, and/or submersible instead of skid/pedestal mounted, and/or hydraulic or electric instead of integrated diesel. If the 12-inch 5,000 gallon-per-minute pump 000 were replaced by a submersible pump, the self-priming capability would obviously become unnecessary. Another advantage of using a submersible pump is that the 12-inch pump suction hoses 107 and 210 could be eliminated (and with them the common concern of clogging in the 12-inch pump suction hose 107 and 210 would be eliminated). A system using a submersible pump could integrate the transverse auger pump inlet 010, submersible pump, and a hose reel similar to hose reel 060 into a single, compact module perhaps deployable on an autonomous vessel. However, there are advantages to using pumps mounted onboard larger vessels, the primary being that keeping said pumps onboard, as opposed to submersible, allows the use of much larger pumps than would be otherwise possible.

Increasing capacity of the SOScarbon system embodiments contained in FIGS. 2 and 3 for executing pumping-to-depth methods 100 and 200, respectively, would involve using more pumps similar to the 12-inch 5,000 gallon-per-minute pump 000 and/or using pump(s) larger than the 12-inch 5,000 gallon-per-minute pump 000 (centrifugal pumps, for example, can provide flowrates >100,000 GPM given there is space and holding capacity for them onboard vessels 101 and 201). The former option of using more pumps, each with their own pump inlet device, in parallel, is the preferred method for increasing SOScarbon vessel capacity.

One can imagine systems very similar to those in FIGS. 2 and 3 but with many 12-inch 5,000 gallon-per-minute pumps 000, suction inlet devices 010 and 030, and booms 105 and 203 in parallel, deployed from both sides of vessels similar to, but larger than, vessels 101 and 201.

For example, a high capacity version of the system in FIG. 2 may use 3 transverse auger suction inlets 010 in parallel, in the same apex of funneling boom 105 where the length and angle of inclination of said funneling boom 105 are increased to 60 meters and 45 degrees, respectively (to increase the collection width of funneling boom 105 to 45 meters such that 50% solids concentration is maintained at the increased pumping capacity), are used to feed 3 independent 12-inch 5,000 gallon-per-minute pumps 000, which in turn pump-to-depth through 3 independent hose reels 060. The same parallelized set of 3 pumps, pump inlet devices, and hose reels could be deployed from both sides of the larger version of vessel 101, to achieve a total pump-to-depth capacity of 30,000 GPM. Very large oilfield utility vessels, for example, may be able to accommodate even more pump-to-depth capacity by simply increasing funneling boom 105 collection width and/or adding more pump, pump inlet, hose reel sets in parallel.

Similarly, a high capacity version of the system in FIG. 3 may use 3 sump suction inlets 030 in parallel, feeding 3 independent 12-inch 5,000 gallon-per-minute pumps 000, which pump-to-depth through 3 independent hose reels 060. The same arrangement could be deployed from both sides of the larger version of vessel 201, to achieve a total pump-to-depth capacity of 30,000 GPM. In order to maintain a high solids concentration at the increased pumping capacity, booms 203 could be pulled proportionally faster than the initial recommended pulling speed of 0.5-2 meters per second so long as said boom reel 207 (or larger coiling pad deploying longer boom 203 lengths) is powerful enough to overcome increased drag, and, more importantly, that the booms 203 do not suffer arching, bridging, submergence, mechanical failure or concentrate encircled sargassum 206 so much that its submerged thickness exceeds the skirt depth of the booms 203. Very large oilfield utility vessels, for example, may be able to accommodate even more pump-to-depth capacity by simply increasing booms 203 pulling speed and/or adding more pump, pump inlet, hose reel sets in parallel.

The latter option of using larger pump(s) for increasing SOScarbon system capacity would require that larger hosepipe be used (5,000 gallon-per-minute is about the limit of what should be pumped through 12-inch hose/pipe) or multi-suction/multi-discharge (multiple hoses/pipes are used to carry the full flowrate into/out of the pump), making hoses/pipes more expensive, heavier, less flexible and, therefore, harder to implement. Not to mention, pumps larger than 12-inch 5,000 gallon-per-minute pump 000, for example, can start to become harder to operate—for example, larger pumps may exhibit a higher susceptibility to cavitation and/or a narrower best efficiency region and/or be more susceptible to general mechanical failure if conditions are not tightly controlled.

One of the prime advantages of the pump-to-depth method is its extremely low specific energy consumption (SEC; J/m3 sargassum consumed to pump-to-depth). This low energy consumption is owed to the fact that pumping-to-depth essentially experiences zero static head loss—the total dynamic head of the pumping process being comprised only of friction losses and geometric losses (bends and/or entry/exit losses) in the hoses/pipes. As an example, assuming the 12-inch 5,000 gallon-per-minute pump 000 operating at ~5000 GPM (1100 cubic meters per pump per hour), with a pump hydraulic efficiency of 41% (the low end of the efficiency range for the Godwin DPC300 pump represented by the 12-inch 5,000 gallon-per-minute pump 000), then applying viscosity, slurry, and solids correction factors, the specific energy consumption of pumping-to-depth is calculated as 1.53 MJ/m$^3$. Tests of a system very similar to the system embodiment contained in FIG. 2 for executing pumping-to-depth methods 100, confirmed this low energy consumption.

The only reason for using larger pumps/hoses/pipes would be to achieve better hydraulic efficiencies. However, because pumping-to-depth is already so energy efficient compared to other costs (other process costs and the presumed overhead for running an SOScarbon operation), it not considered to be worth the added capital and mechanical complication. Pump/hoses/pipes might actually better be reduced from the 12-inch sizes imposed by the 12-inch 5,000 gallon-per-minute pump 000, perhaps to 8-10" systems, in order to reduce capital cost and ease of implementation.

In summary, the essential elements in the pump-to-depth systems are: (1) vessels, (2) pump(s), (3) hose(s), and (4) inlet device(s), the latter three connected, by necessity, by piping or hoses. Each length of piping can be either short, meaning the components at the nodes are immediately adjacent, or extended, perhaps allowing for independent mobility between the components. Additionally, pump(s) can either be onboard the vessel or deployed in the water with the inlet device(s). Many independent series of (1) vessels, (2) pump(s), (3) hose(s), and (4) pump inlet device(s) can be deployed in parallel on the same vessels.

The pump collection mechanisms described herein can match/far exceed the capacity of currently employed conveyor systems (deployed on aforementioned barges for collecting sargassum from in front of barriers), require much less maintenance (robust construction and a single moving part, the impeller), and are much more dispatchable as they can be quickly installed/uninstalled on any ordinary vessel (no need for custom-built vessels or invasive retrofitting), shipped around the world, many times operating on a lease/rental basis (which is particularly useful to sargassum management as its arrival is a seasonal phenomenon).

Moreover, by sinking carbon content present in the sargassum deep in the ocean, avoiding landfill/coastal methanogenesis, and increasing the overall biological pumping capacity of the Caribbean, SOS represents a new method of carbon reduction/offsetting with great potential (on the order of 100 s of millions of tons CO2 equivalent per year).

Pumping-to-depth offers a more sustainable (physically more space), more eco-friendly (no methane emissions or heavy metal leakage to surroundings) disposal method than the current management practice. Pumping-to-depth is the single most reliable way of sequestering sargassum in the deep ocean. By sinking the sargassum in a whole state, direct from the surface, to a depth where hydrostatic pressure completely compresses its buoyant pneumatocysts so it continues to sink in its whole state, naturally, the pollution/landfall potential is minimized. Other methods of rendering sargassum negatively buoyant at the surface, like crushing with rollers, may not completely rupture 100% of pneumatocysts (which is necessary for inducing negative buoyancy), leaving sargassum sufficiently buoyant to remain afloat, whereas not a single bladder will be able to escape hydrostatic pressure at depth, leading to much more reliable sinking.

2 Specialty Vessels

While system embodiments contained in FIGS. 2 and 3 for executing pumping-to-depth methods 100 and 200, respectively, show bow pump-to-depth systems could be deployed on repurposed/retrofitted vessels 101 and 201, of generic design, there are many specialty vessels already inexistence, or that could be custom-built, to be specifically conducive towards carrying pump-to-depth systems. Examples of said specialty vessels already in existence include purse seine fishing vessels, benthic trawling vessels, whaling ships, outrigger (shrimping) trawlers, large workboat catamarans, etc.

Figure 4:
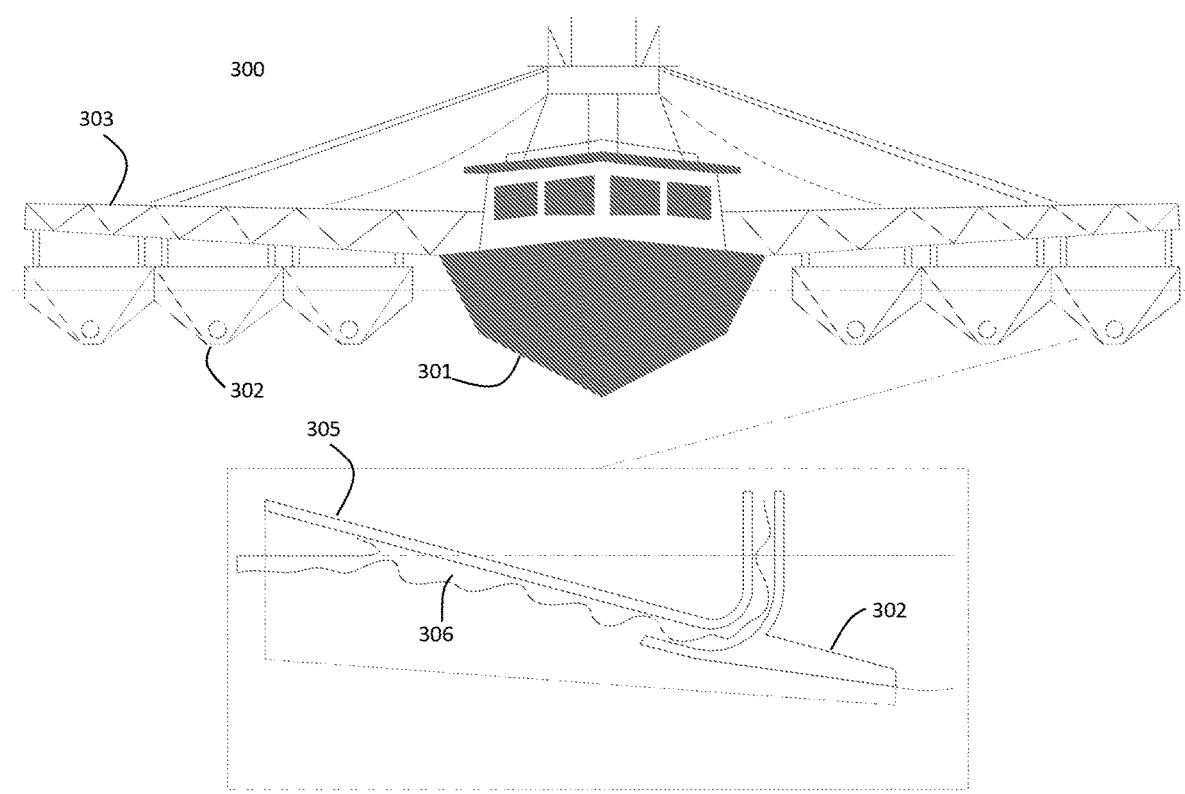
FIG. 4 shows a system 300 that uses many inlets in parallel, instead of booms, to extend its collection width

FIG. 4 shows an example of an alternative system 300 to the system embodiment contained in FIG. 2 for executing pumping-to-depth method 100, that uses a specialty vessel for carrying a pump-to-depth system. In FIG. 4, an outrigger (shrimping) trawler 301 is equipped planing pump inlet devices 302 along the entire length of its outriggered trusses 303. As opposed to the system embodiment contained in FIG. 2 for executing pumping-to-depth method 100, wherein funneling boom 105 is used to provide the desires collection width, system 300 accomplishes its collection width by stringing a plurality of planing pump inlet devices 302 along the entire span of its outrigger trusses 303. The planing pump inlet devices 302 operate by using partially submerged planes 305, with a positive angle of attack, to push water and sargassum 306 underwater, similar to a 0-degree deadrise planing hull, where it et counters pump inlets (perhaps also containing co-axial or transverse augers to meter the flow of solids into the pump inlets).

Another example of a specialty vessel for deploying a pump-to-depth system may comprise a hybrid vessel with, ideally a cata-/tri-maran that uses its hulls as funneling structures for sargassum, with a pitching wall with a conveyor/rake excavator on one side and a planing wall and auger device pump inlet on the other. The interchangeable conveyor and pump inlet, combined with the low draft of the cata-/tri-maran would enable such a vessel to perform collection near shore or in offshore water not appropriate for sequestration (because of insufficient depth or another reason) and then transport the same lot to deep water for sequestration. Alternatively, such a vessel could operate as an ocean in-situ sequestration vessel (wherein sargassum is not collected and rather immediately pump-to-depth—or otherwise sequestered).

There are many more specialty vessels that could be particularly conducive to carrying pump-to-depth systems, each prompting slightly different system construction (making it impractical to summarize them all in the present submission), but all use the watt basic pump-to-depth methods 100 and/or 200 and system elements (1) vessels, (2) pump(s), (3) hose(s), and (4) pump inlet device(s), with similar system architectures to those illustrated in FIGS. 2 and 3, that sequester sargassum by transporting it to/below the critical depth (150-200 meters).

3 Pump Inlet Devices

It is important to note the transverse auger pump inlet 010 and sump pump inlet 030 in FIGS. 2 and 3 are two of five pump inlet devices in the current submission. While each pump inlet has a preferred implementation—the transverse auger pump inlet 010 being better suited for method 100 and sump pump inlet 030 being better suited for method 200—any of the pump inlet devices could be used in any of the pump-to-depth system embodiment, because they all accomplish the same basic functional requirements: (1) concentrate sargassum, (2) transport sargassum underwater here it will encounter suction inlets (suction inlets preferably remain below waterline at all times for aforementioned reasons), and (3) maintain a consistent, high sargassum flow into suction inlets. The five pump inlet devices of the present submission are: transverse auger suction inlet 010, co-axial auger suction inlet 020, sump suction inlet 030, suction boom 040 and suction tee 050.

Again, each suction inlet device concept has an optimal system architecture associated with it. While each inlet device has a use-case in which it might perform best, it is maintained that any of the inlet devices could be used in any possible scenario: open ocean, barrier cleaning, marina cleaning, power plant, water intake cleaning, emergency response, open ocean disposal, and/or beach cleaning; mounted on any vessel: utility boat, barge, etc.; and either discharged into a receptacle for transport, or directly into a pump inlet to be transported deep below the surface of the ocean (150-200 meters) for sequestration. Note that a two-stage system wherein an onboard pump-to-depth pump is fed by a conveyor (bucket or rake) or a modified snow blower that collects sargassum from the surface of the ocean, instead of a suction inlet, is also possible.

4 Transverse/Co-Axial Auger Suction Inlet Devices

Figure 5:
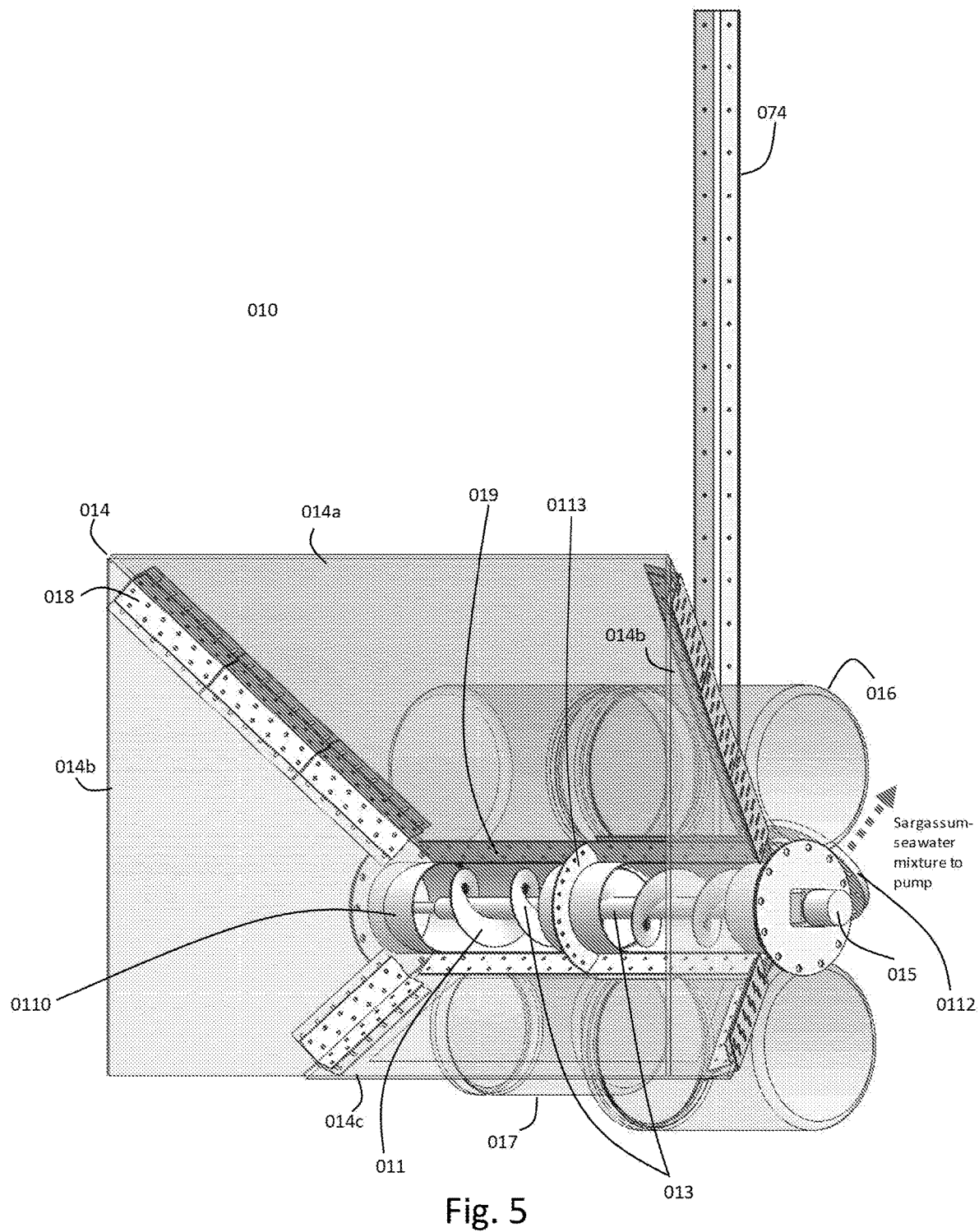
FIG. 5 shows a pump inlet device 010 with a left-handed/right-handed (center-feed), transverse auger 011 for preventing arch formation and metering solids (i.e., sargassum) into said pump (for clog prevention).
Figure 6:
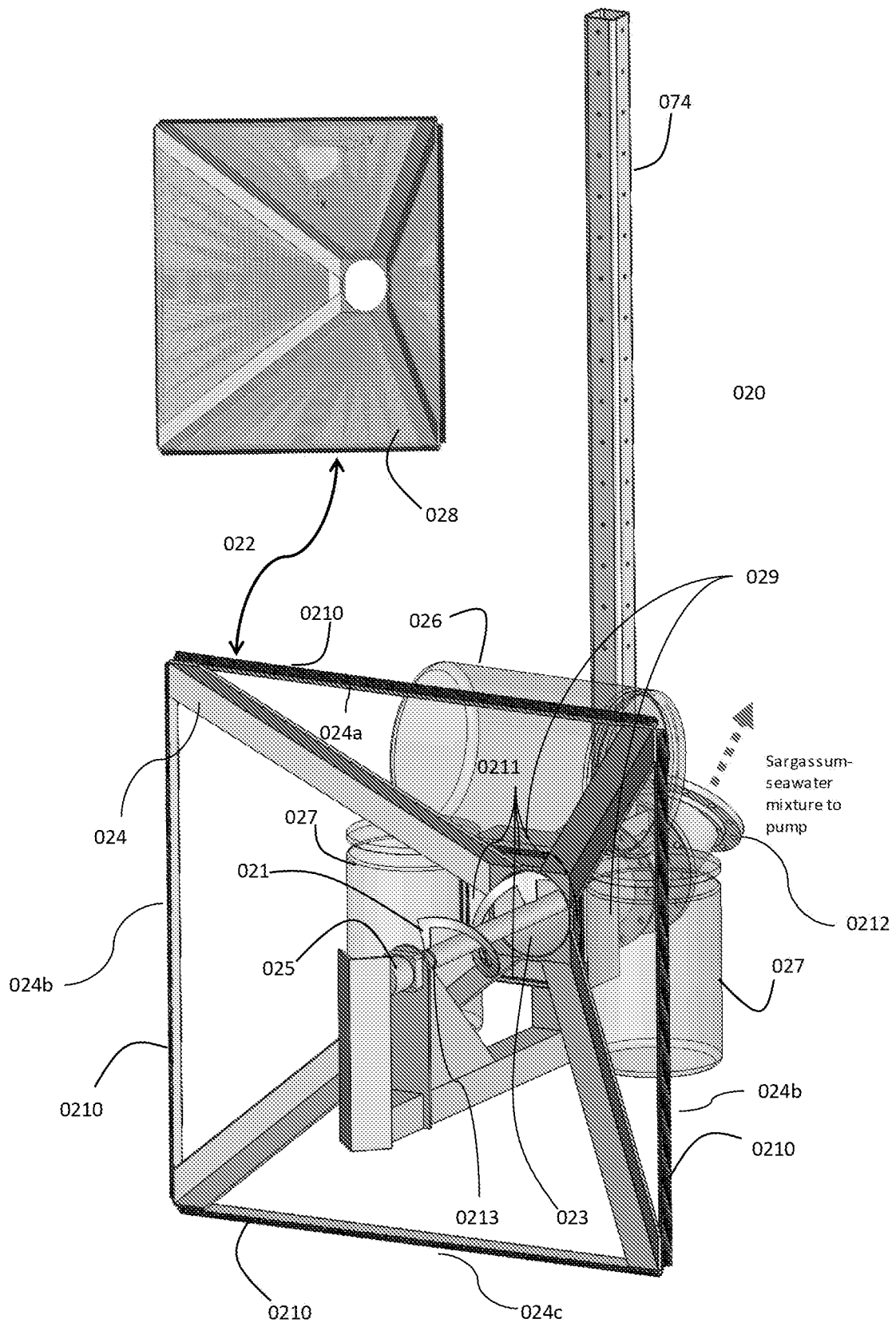
FIG. 6 shows a pump inlet device 020 with a coaxial auger 021 for preventing arch formation and metering solids (i.e., sargassum) into said pump (for clog prevention).

FIGS. 5 and 6 show transverse auger suction inlet 010 and co-axial auger suction inlet 020, two pump-to-depth suction inlet devices that use augers of different orientations (transverse and co-axial with the suction hose, respectively) to meter sargassum flow into suction openings.

In FIG. 5, showing the transverse auger suction inlet 010, a left-handed/right-handed (center-feed), 12-inch OD, 12-inch pitch, 8 ft-long, transverse auger 011 is of mild steel construction with solid, helical flighting and turns inside a schedule 10, 12-inch pipe steel casing 0110. Steel casing 0110 has two windows cut that form the suction inlets 013. Steel casing 0110 has an exit in it back-center where there is a welded saddle joint to another schedule 10, 12-inch pipe neck 0112 to which the pump suction hose attaches and extracts collected sargassum from the transverse auger suction inlet 010. The steel casing 0110 and neck 0112 are reinforced with welded splines 0113 and 019.

The transverse auger suction inlet 010 has a solid, four-sided, converging funnel 014 made from marine grade, 0.75"-thick plywood that is three meters wide at its opening. The panels 014a, 014b, and 014c, are bolted together along their seams with bent sheet metal sandwiches 018 bearing mating bolt patterns that accept ¼"-20 bolts, making for an rigid joint. The top panel 014a of funnel 014 acts like an inclined plane, transporting sargassum down towards the suction inlets 013, as sargassum enters the wooden funnel 014. The side panels 014b act like funnels, concentrating sargassum towards suction inlets 013. The bottom panel 014c acts like a scoop to prevent sargassum from escaping beneath the funnel 014. The panels 014a, 014b, and 014c of funnel 014 are attached to steel casing 0110 by a bolted sandwich connection to splines 019.

The funnel 014 relies on the relative motion of the water/sargassum entering it to force sargassum downward, towards the suction inlets 013, where sargassum becomes entrained in inlet flow and is pulled towards suction inlets 013. Upon entering steel casing 0110, the transverse auger 011 feeds sargassum towards the back-center of the steel casing 0110 where it enters the pump suction hose through neck 0112 and travels through a suction hose to the pump inlet. The transverse auger prevents suction hose and pump clogs by imposing a set sargassum flowrate (limiting the solids concentration of the flow through suction hose and into the pump).

In FIG. 6, showing the co-axial auger suction inlet 020, a right-handed, 12-inch OD, 30" pitch, 4 ft-long, co-axial auger 011 is co-axial with and extends into suction inlet 023 (extending in by at least one full flight, which is necessary for imposing a solids flow rate). The co-axial auger 021 is of mild steel construction with spoked, helical flighting and turns inside a schedule 40, 12-inch aluminum pipe suction inlet 023. It is recommended that the co-axial auger 021, supported by motor 025 (through a rigid, keyed coupling 0213) on one end, also be supported on the other end by another bearing/bushing mounted inside the suction inlet 023 pump. Once sargassum enters the suction inlet 023, it moves directly to the pump suction hose, which extracts collected sargassum from the co-axial auger suction inlet 020.

The co-axial auger suction inlet 020 has a four-sided, converging, pervious funnel 024 made up of a welded aluminum frame 022 that is three meters wide at its opening. The frame 022 is wound with high strength fishing line (alternatively braided wire, string, etc.) wound in a high resolution (perhaps a wind everything 0.25" along the four crossbars 0210), radial pattern 028 (only in the radial direction on not in the circumferential direction) around the suction inlet 023, covering all four sides of the frame 022. Each side of the frame 022 is wound with a single piece of fishing line wound around crossbars 0210 and pegs 0211 near suction inlet 023, with 50-100 lbs of tension in each span. The resulting funnel 024 is pervious to water, but not to sargassum. The radial winding pattern 028 conveys sargassum towards the suction inlet 023 without the clog risk of woven netting, or other water-pervious coverings for the frame 022. The top panel 024a of funnel 024 acts like an inclined plane, transporting sargassum down towards the suction inlet 023, as sargassum enters the pervious funnel 024. The side panels 024b act like funnels, concentrating sargassum towards suction inlets 023. The bottom panel 024c acts like a scoop to prevent sargassum from escaping beneath the funnel 024.

The funnel 024 relies on the relative motion of the water/sargassum entering it to force sargassum downward, towards the suction inlet 023, where sargassum becomes entrained in inlet flow and is pulled towards suction inlet 023. Upon entering suction inlet 023, the co-axial auger 021 limits the rate of solids ingress into the inlet where-after it enters the pump suction hose through fitting 0212 and travels through a suction hose to the pump inlet. The co-axial auger prevents suction hose and pump clogs by imposing a set sargassum flowrate (limiting the solids concentration of the flow through suction hose and into the pump).

Note that funnel 014 from FIG. 5 could be a pervious funnel similar to funnel 024 in FIG. 6 and funnel 024 from FIG. 6 could be a solid funnel like funnel 014 in FIG. 5. The pervious funnel 024 in FIG. 6 with the radial pattern 028 is the preferred embodiment of funnels 014 and 024 because it has demonstrated, in practice, a considerable reduction in wave forces experienced by auger inlet devices 010 and 020 and a considerable increase in inlet feed efficiency. The solid funnel suffers from two primary issues: (1) even at moderate forward speeds of 0.5 meters per second (in pump-to-depth moving method 100, for example) the positive pressure head created in front of the solid funnel is enough to overcome the negative pressure gradient imposed by the suction inlets 013 and 023 inside the funnels 014 and 024, preventing sargassum from entering the funnels 014 and 024 altogether, and (2) when the solid funnel heaves up and down in waves, solid panels 014*a*/024*a* act like wedges, displacing seawater and sargassum as they crash in and out of the water. Because the panels are solid, the displaced water has nowhere to go but around the edges of the funnel, creating strong eddies at the edges of the solid funnel, which pull sargassum out of the funnel, around the edges. Water-pervious funnels are not susceptible to the same failures. Overall, the waves forces experienced by the solid funnel are extremely disruptive to suction inlet 013 and 023 feed efficiency. Therefore, water-pervious funnels, with the radial pattern 028 shown in FIG. 6, are the preferred embodiments of funnels 014 and 024 in auger inlet devices 010 and 020.

The transverse auger suction inlet 010 and co-axial auger suction inlet 020 address a major issue with funneling sargassum towards suction inlets 013 and 023: stable arch formation. Just as bulk materials can form stable arches in the bottoms of hopper discharge bins (preventing mass flow of material), stable arches of sargassum floating on the surface of the ocean can form in the apexes of funnels 014 and 024. This will prevent further feeding of sargassum gas long as the arch is present. The transverse auger suction inlet 010 prevents an arch of sargassum forming in the funnel 014 because the rotating transverse auger 011 does not allow the formation of stable arch "feet" (because transverse auger 0111 spans the entire apex of the funnel 014 and constantly rotates). The co-axial auger suction inlet 020 prevents arch formation by disrupting the formation of said arch "keystone" because the co-axial auger 021 physically interrupts this region of the arch.

The particular embodiments of transverse auger suction inlet 010 and co-axial auger suction inlet 020 in FIGS. 5 and 6, respectively, show a post 074 extending upward. This post 074 is meant to insert into a sleeve 073 of crane 070, shown in FIG. 11. This sleeve 073 allows post 074 to slide freely inside it (this interface may be greased with a waterproof grease to reduce friction). The linear degree of freedom afforded by sleeve 073 allows the transverse auger suction inlet 010 and co-axial auger suction inlet 020 to wave-follow. The goal of this wave-following is to keep the top of suction inlets 013 and 023 at least 12 inches below the free surface. Insufficient still-water depths and/or hydrostatic preload of the auger inlet devices 010 and 020 could lead to unsatisfactory wave-following, especially likely in aggressive wave states, causing the suction inlets 013 and 023 to repeatedly come out of water aspirating the suction hoses and causing pumps to repeatedly lose suction. Ballast for auger inlet devices 010 and 020 is provided by the weight of the devices themselves, each weight 300-500 lbs. Floatation for auger inlet devices 010 and 020 is provided by 55 gallon barrels 016 and 026 and 30 gallon barrels 017 and 027. The floatation barrels 016, 026, 017 and 027 are secured using ratchet straps that pull said barrels into the veer formed by the sides of funnels 014 and 024 and purpose-built plates (see plates 029 in FIG. 6, for example). These different sizes of floatation barrels (55 gallon and 30 gallon) can be rearranged and/or filled with water (or other ballast) in order to fine tune the floatation of auger inlet devices 010 and 020. Once floatation is finalized, floatation barrels 016, 026, 017 and 027 are preferably sealed with silicone sealant.

The post 074 is retained inside the sleeve 073 by a set of high strength pins inserted through the holes in post 074 above the sleeve 073 (such that when the crane 070 is lifted, a pin in post 074 will interfere with the top of the sleeve 073 and the entire transverse auger suction inlet 010 can be lifted out of the water).

Note that the auger inlet devices 010 and 020 could be held rigidly, without the linear degree of freedom afforded by sleeve 073, but this would require a deeper still-water depth (>12-inch) to keep the suction inlets 013 and 023 underwater in waves (without the ability to wave-follow). With suction inlets 013 and 023 farther below the free surface, more sargassum will need to accumulate and/or funnels 014 and 024 will need higher relative speeds in order for sargassum to be pushed down far enough to encounter suction inlets 013 and 023. Not to mention, if the auger inlet devices 010 and 020 are rigidly coupled to vessels 101 or 201, for example, then wave forces could be prohibitively strong and suction inlet 013 and 023 submergence could still become an issue if vessel 101 and 201 roll is out of phase with incident waves (which is usually the case).

Transverse auger 011 and co-axial auger 021 are driven, through rigid, keyed couplings, by 5000 in-lbs hydraulic wheel motors 015 and 025. The motors have heavy-duty bearings (at least 4000-5000 lbs of radial load capacity) and are capable of turning between 0-900 rpm. This range allows the augers 011 and 021 to turn slowly in the case of high concentrations of incoming sargassum and also turn fast enough to essentially be "hydraulically invisible", meaning the auger flighting is moving at the same linear speed as the fluid flowing through suction inlets 013 and 023 with the 12-inch 5,000 gallon-per-minute pump 000 (which is ~4.5 meters per second in 12-inch plumbing). However, submerged auger flighting turning at high rates tends to throw off repulsive radial/centrifugal flow because the flighting is acting like a paddle/blower. This repulsive flow prevents sargassum from entering flighting of augers 011 and 021 and suction inlets 013 and 021. In practice, it has been found that 12-inch auger speeds should be limited to 200-300 rpm max to avoid this problem.

Despite transverse auger 011 being solid/12-inch pitch/12-inch OD and co-axial auger 021 being spoked/30" pitch/12-inch OD in the embodiments of FIGS. 5 and 6, the augers 011 and 021 could both be of varying sizes (ODs and pitch:OD ratios), geometries, and designs—spoked/not, serrated/not, compliant/not, finger/brushes/rigid flighting, tapered/not, paddles/not, variable pitch/not, variable shaft diameter/not, cusped/not, shafted/shaftless, etc. To prevent wedging of flotsam and jetsam, or other unwanted pelagic debris, between augers 011 and 021 and casings, a number of countermeasures may be employed: spring-preloaded walls, serrated/interrupted flighting, compliant auger flighting material, force-limiting clutch/shear pins, brushes/compliant trim on the flight edges, and/or simply chamfered flighting edges. Finally, it is maintained that dogging may not be a concern in some cases (when suction hose is short and relatively straight, for example) and provisions are made to remove the auger(s) 011 and 021 from auger suction inlets 010 and 020, such that suction inlets 013 and 023 are left unobstructed.

While the auger suction inlets 010 and 020 could be used for pump-to-depth methods 100 or 200 (in place of sump suction inlet 030 in FIG. 3), the auger suction inlets 010 and 020 are naturally more suited to moving pump-to-depth method 100. The auger suction inlets 010 and 020 could also be mounted on a powered barge or other vessel, whereupon a pump and a container for storing collected sargassum exists, to aid/replace the conveyor vessels currently used (e.g. by Algae Nova) to clean along floating barriers near shore, without pumping-to-depth (sargassum collected along barriers could then be transported to deeper water for pumping-to-depth; such a two-stage system is discussed again later in this submission).

Summary of Suction Inlet Devices

One should notice that the principles of one inlet device embodiment may be used with others. It is quite easy to imagine many hybrid combinations of the various inlet devices. The true ingenuity of the inlet devices exists in their fundamental operational principles—vees concentrating, gravity-feeding, planing, weirs to pull across the free surface and control solids concentration, high downward velocities in confined cross-sectional areas to entrain sargassum, augers to transport/feed/prevent clogging, and impellers to throw and/or transport using water as a carrying fluid—not in their exact manifestation/implementation. While each inlet is presented in its purest form herein, it is maintained that hybrids of these devices, or their constituent components, have also been considered.

Sump Suction Inlet Device

Figure 7:
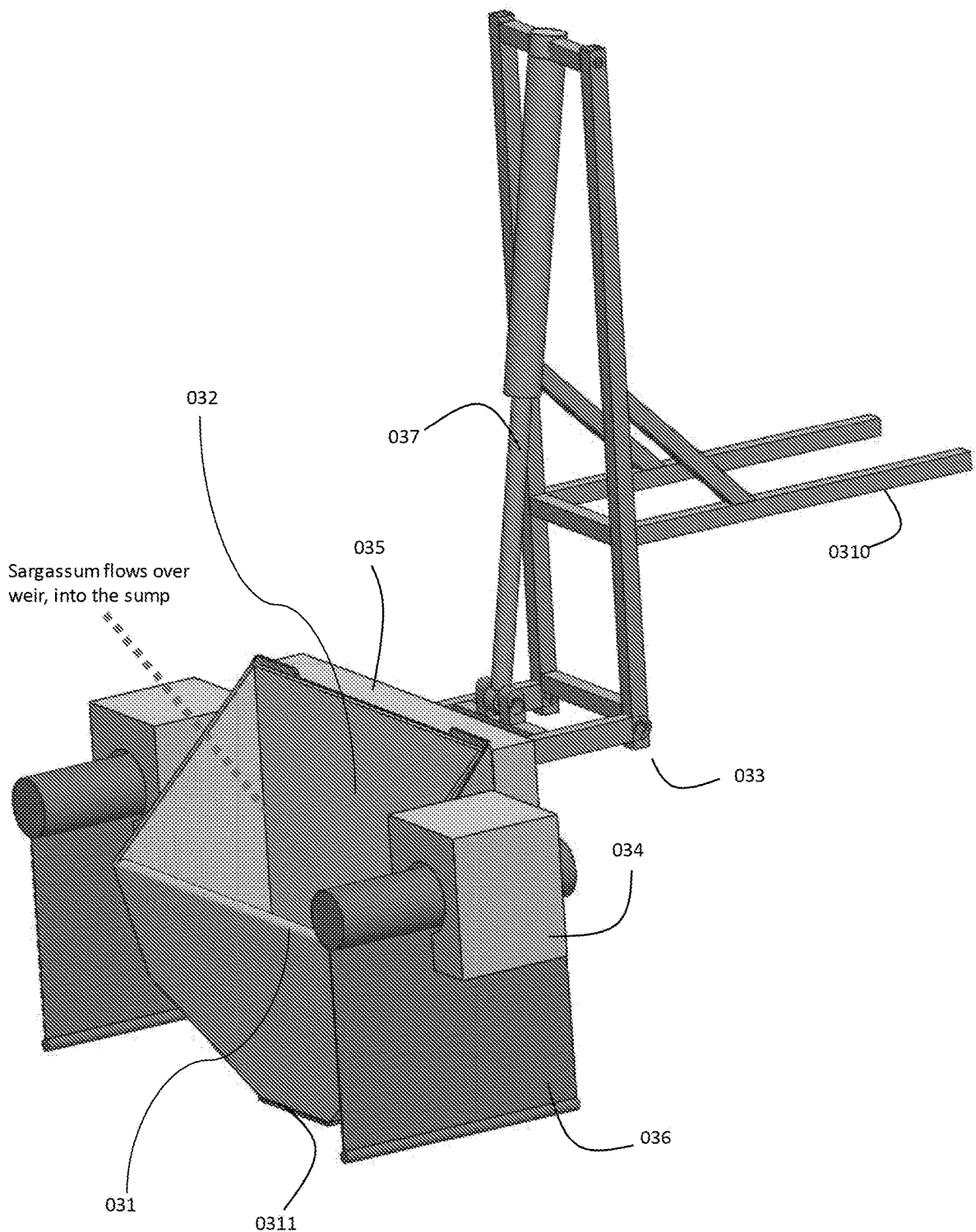
FIG. 7 shows a pump inlet device 030 with a weir 031 over which sargassum and seawater flows into a sump 032 of confined cross-sectional such that sargassum is pulled down towards a pump suction hose inlet inside said sump 032.

An embodiment of the sump suction inlet, shown in FIG. 7 relies on a specific submerged depth of a weir 031 to provide the desired flowrate and solids concentration, further relying on the constrained geometry (limited cross-sectional area) of the sump 032 to create sufficient downward velocity inside the sump such that sargassum is transported towards submerged suction piping against its natural rate-of-rise in seawater (~0.2 meters per second). This makes the sump inlet more appropriate as a stationary device that is "fed" with sargassum by natural current or by various booming operations (preferably pump-to-depth method 200). However, a moving version of the sump inlet could be realized at low speeds, about 1-2 knots, and in relatively small waves, namely those less than 0.5 meters.

Any shape could be used for the sump, but a slender rectangle of high aspect ratio, 3:1 to 10:1, has the highest perimeter to surface area ratio allowing it to sustain large flowrates, at low weir depths, while still maintaining plenty of downward velocity inside the sump. Whether the sump is free-floating or constrained by a 1 or 2 degree of freedom, rotary and/or linear linkage (the embodiment in FIG. 7 has a 1 degree of freedom pivot 033, below the deck, close to the waterline, that allows it to wave-follow) attached to the deployment vessel, an instability exists in that if, even for a moment, the flow of water over the weir is less than the pump flowrate, the sunup will become more and more buoyant, eventually exiting the water and forcing the pump to run dry. A countermeasure to this risk is to heavily hydrostatically preload the sump (using ballast 0311 and floatation 034 and 035) such that the force balance on the sump depends relatively little on the standing water level in the sump. This sensitivity may also be addressed by optimizing the shape of the weir 031 to maximize the discharge coefficient by using an ogee curve, labyrinth weir, or a piano key weir (commonly used to maximize the discharge capacity of spillways in large dams) such that there is more flow per unit head above the weir and the sump is kept as full as possible at all times. The exterior hydrodynamic form of the sump is designed to minimize surge and sway forces that are out of phase with the heave forces the sump (hence the drafted form of the sump) is meant to mimic while still holding enough volume to give ample time to respond in case of dry-running.

The sump suction inlet 030 in FIG. 7 is designed for use with 12-inch 5,000 gallon-per-minute, requiring it to be 1.75 meters long and for the weir 031 to be 0.2 meters underwater at least (sump designed for larger pump could be as long as 15-30 meters taking up the entire side of the deployment vessel). Here, the sump is deployed and retracted with a hydraulic/pneumatic cylinder 037, which may also provide some spring stiffness and damping. Here, a purse seining boom 036 (pump to depth method 200) is used to pull sargassum into the sump, creating a seal against floatation 034. Deck frame, 0310 is pinned to the deck of the deployment vessel.

The sump-inlet is preferable one that is capable of providing a consistent, high volumetric solids concentration to the pump inlet. The sump is one that preferably prevents itself from running dry, even in rough water, as failing to do so might cause damage to the pump, but moreover makes the sequestering process extremely inefficient as the pump will be required to continuously re-prime itself. This risk may be accentuated in waves because the waterline may recede below the inlet edge of the sump across large sections, or for long periods of time. The inlet of a sump's given shape/size is limited by the surface area/cross-sectional area ratio. Streamlining the inlet edge of the sump extends this range. While increasing the depth of the sump's inlet edge below the free surface of the water also extends this range, it is detrimental to providing a high solids concentration and should not be used as a means of increasing allowable volumetric flowrate. Wave amplitude has a great effect on volumetric solids concentration while wavelength has negligible effect. Both the concentration imposed by the collection boom, and the depth of the leading edge of the sump below the water, can be used to control and maximize the solids concentration of the sargassum-seawater slurry flowing into the pumps.

A slender rectangular sump has a much smaller footprint than a circular sump rated for the same volumetric flowrate, meaning that it takes less space (it could perhaps even be stored in an outboard position) and can be deployed immediately next to the ship (decreasing the size and complexity of the deployment mechanism). A rectangular sump is easy to make, transport, install, and maintain. A rectangular sump is lighter and more compact than a circular sump of equivalent rated volumetric flow, meaning it will have less effect on ship dynamics. Lastly, a rectangular sump lends itself to sealing against the collection boom(s).

FIG. 7 shows the sump suction inlet geometry specifically designed for a 5000 GPM pump, comprising a rectangular prism with drafted floor. Sargassum and seawater flow over the leading edge into the sump. A filleted leading edge maximizes flow-rate to decrease the chance of dry-running and allowing the leading-edge to remain close to the free surface, maximizing volumetric solids concentration. The remaining planes are all flat, zero draft tessellations. The cross-sectional area of the sump is small enough such that the volumetric flowrate out (via the pump) causes sufficient downward velocity inside the sump to pull sargassum down (against its natural rate-of-rise) towards suction inlet piping.

Typically, there will be one sump for every pump, so that each of the sump-pump-pipe-hose modules can act as independent units (as opposed to one sump per multiple pumps or one pump with multi-suction inlet). This allows variable sinking rate and allows continued operation in the case that one module is out of service. Only the distal edge of the sump acts as the "leading edge," lying below the free surface and sustaining a flow of sargassum and seawater over it (the proximal edge of the sump is above the waterline).

Suction Boom and Suction Tee

Figure 8:
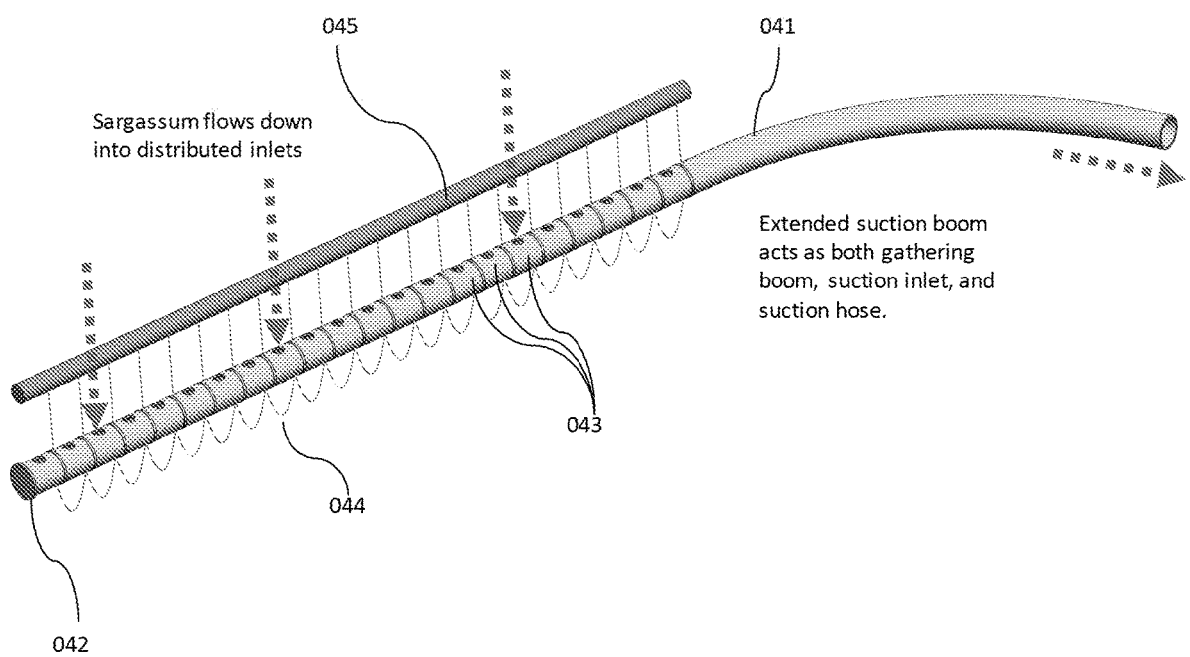
FIG. 8 shows a flexible, extended suction boom 040 with inlets 041 distributed along its length that acts as a gathering boom, pump inlet, and suction hose.

An embodiment of the "suction boom" 040, shown in FIG. 8, comprises an extended suction pipe/hose 041, with its distal end 042 capped/sealed, with distributed inlets 043 spread along the entire length. The design goal of the suction boom 040 is to maximize the length of continuous suction region where the inlet velocity is divided but still locally high enough to entrain sargassum. Distributed inlets 043 (at least 5" OD) should be spaced 3-5 diameters center-to-center (suction cones should overlap to avoid gaps in the suction field for sargassum to escape through). Because pressure losses between inlets 043 is much less than the pressure losses through the inlets 043 themselves, there is approximately equal flowrate through each inlet along the entire length of the boom. Floatation 045 and chain ballast 044, attached frequently along the length, counteract wave forces and internal forces from flow through the suction boom 040 as it adopts the curvature of ocean waves. The inlets 043 may be of varying size/shape/spacing. Funnels and/or weirs may be added near each inlet 043 to increase the capture efficiency of sargassum.

A large scale SOScarbon system for implementing pumping-to-depth may wish to use very large pumps (>100,000 GPM) to increase capacity and efficiency. A challenge exists here because very large pumps with single inlets are best fed with sargassum very quickly—otherwise the operator would pump only seawater and very little sargassum. Instead of driving the collection vessel very quickly, or pulling a boom extremely fast, the suction boom's extended length will allow collection from a wide swathe, at relatively low velocity locally. Therefore, the suction boom might be very useful, especially if large pumps are considered. It is important to note that the extended suction device not only enables the use of a large pump, but it requires it, otherwise local inlet velocity will not be sufficient to entrain nearby sargassum amidst other ocean forces.

Figure 9:
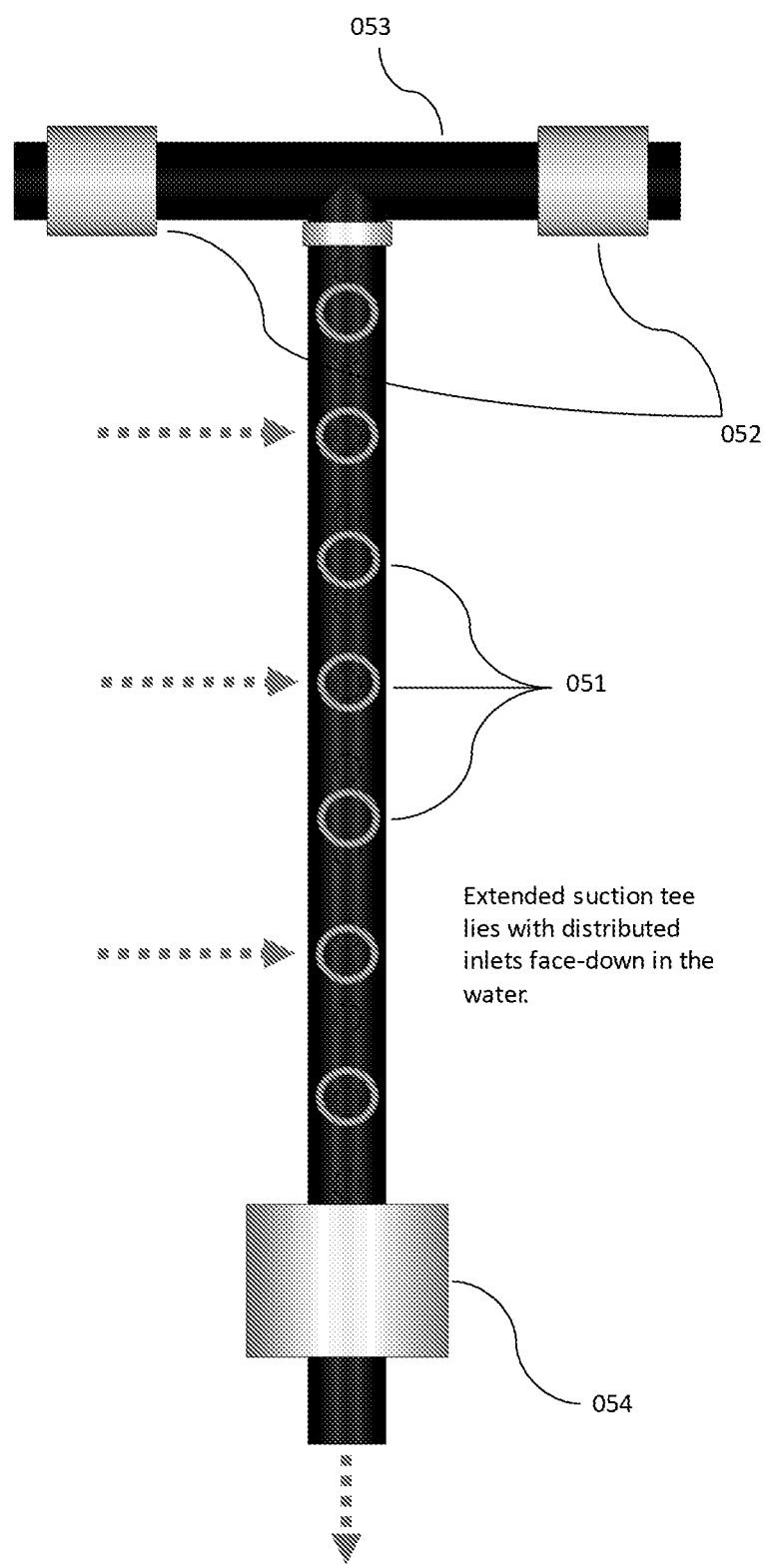
FIG. 9 shows an rigid, extended suction "tee" 050 with inlets 051 distributed along its length that acts as a gathering boom, pump inlet, and suction hose.

The suction boom may be rigid or flexible. FIG. 9 shows a rigid suction "tee" 050 that might incorporate anti-roll floatation 052 and 054 in the form of a "tee" 053 to prevent roll and emergence of inlet openings 051 on the underside of the device in large waves. Because a rigid suction boom cannot be compacted, its length is limited by the size of ship and deployment system used.

The suction boom 040 and suction tee 050 might also be semi-permanently installed along/between floating sargassum barriers or in powerplant cooling water intakes for regular removal of sargassum.

Hose Reel

Figure 10:
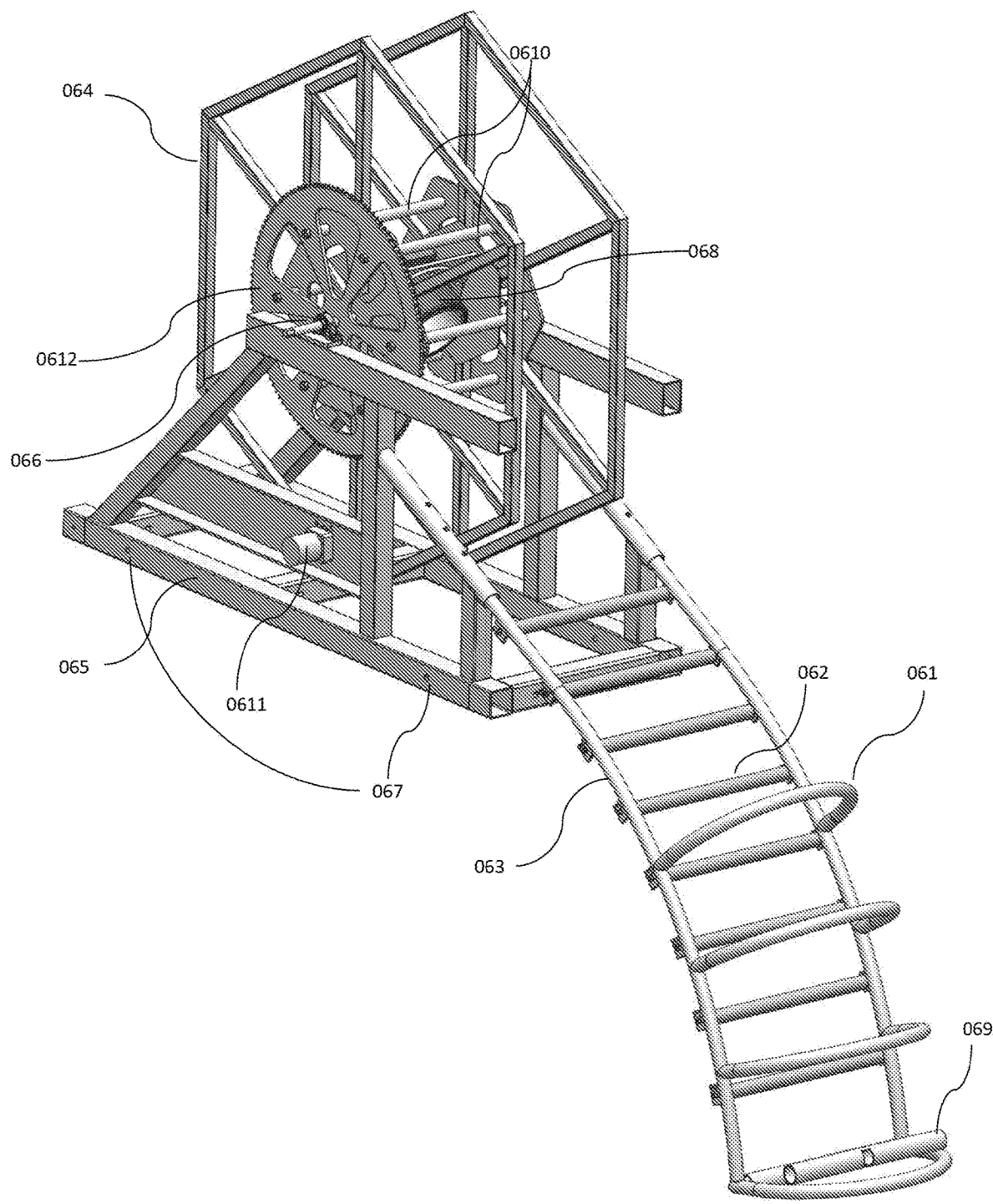
FIG. 10 shows a hose reel 060 that deploys a long, lay flat discharge hose over the side of a vessel using a "stinger" 061 comprising a number of conveyor rollers 062 mounted to curved structural members 063 that extend over the edge of said vessel.

A singular hose reel 060 is what was used on the SOS pilot vessel and is ideal for installing small SOS systems on other repurposed vessels in the future, that only require a single hose, where space may be limited, and where considerable obstacles to placement and securing may exist. Several hose reels 060 could also be implemented in parallel to enable systems with large pump-to-depth capacity. FIG. 10 shows the preferred embodiment of the hose reel 060 with a curved roller conveyor 063, or "stinger", that conveys the hose from a 45-degree start angle, through a 10-ft radius, over the side of the ship, to a 0-degree angle where the hose hangs vertically as it enters the water and extends to the critical depth (150-200 meters).

The 200 meters lay-flat discharge hose (109 and 209 in FIGS. 2 and 3, respectively) deployed and recollected on the hose reel 060, is retained inside the hose reel 060 via a custom integral fitting 068 bolted inside the hose reel 060 center. Care is taken to make sure there are no edges or sharp corners anywhere inside the wagon wheel 064 or curved roller conveyor 063. The hose reel 060 wagon wheel 064 is hexagonal in construction such that the major tip-to-tip diameter of the wagon wheel 064 is 102" (enough to hold >200 meters of 12-inch ID, 0.25"-thick polyurethane lay-flat hose), but the minor flat-to-flat diameter is only 89" such that the wagon wheel 064 could fit inside a standard intermodal container.

The hose reel 060 wagon wheel 064 is actuated by a 5000 in-lbs wheel motor 0611 that transmits torque from a 12-tooth drive sprocket, through a heavy duty ANSI 100 grade chain, to a 120-tooth driven sprocket 0612 on the wagon wheel 064. When the 200-meter lay-flat discharge hose is completely recollected, it wraps around a set of six 2" rungs 0610 in the center of the hose reel 060 wagon wheel 064. When the hose is completely recollected, the kickdown stand 069 is laid over the opening on the distal end of the curved roller conveyor 063, so that the hose weight at the end of the 200-meter lay-flat discharge hose (109 and 209 in FIGS. 2 and 3, respectively) can rest on the kickdown stand 069 and the tension removed from the 200 meter lay-flat discharge hose during transit.

The curved roller conveyors starting height, radius, and starting angle, can be used to avoid obstacles such as railings, bollards, pad eyes, gunwales, etc. This designed also allows the entire footprint of the hose reel to remain on the deck of the vessel, which is better for securing. It is not recommended that a radius any tighter than 10 ft be used to support a lay-flat hose, otherwise the hose may kink, restricting flow, or cause undue stress in the top and outer edges of the lay-flat hose. Another embodiment of the hose reel 060 could be cantilevered out over the edge of the vessel. Such a configuration offers an advantage in that the hose is straight and does not have to adopt the relatively sharp curvature imposed by the curved roller conveyor 063 in the preferred embodiment, while pumping. However, the loft radii imposed by the built and tested curved roller conveyor 063 showed no detrimental effect on hose dynamics or pumping performance, and overall it worked quite nicely and is recommended in the future.

The hose reel 060 wagon wheel 064 is connected to the hose reel base 065 with sealed, heavy-duty (>5000 lbs of radial load capacity) rotary bearings 066 bolted to the hose reel base 065. The hose reel base 065 is ultimately secured to the deck with at least four high-strength pins inserted in pinholes 067, through pairs of pad eyes that straddle the legs of hose reel base 065 and are welded/bolted to the deck. Thus far, all connections to the deck have been made using pins. This practice is recommended in the future, especially when installing SOS systems on repurposed vessels. The pad eyes used on the SOS pilot vessel featured a pattern of staggered holes in both the x and y directions so that one combination of holes always lines up with the holes in the base of the hose reel (or other devices—i.e., cranes and pumps), despite the unevenness of the deck, or errors in manufacturing.

Crane

Figure 11:
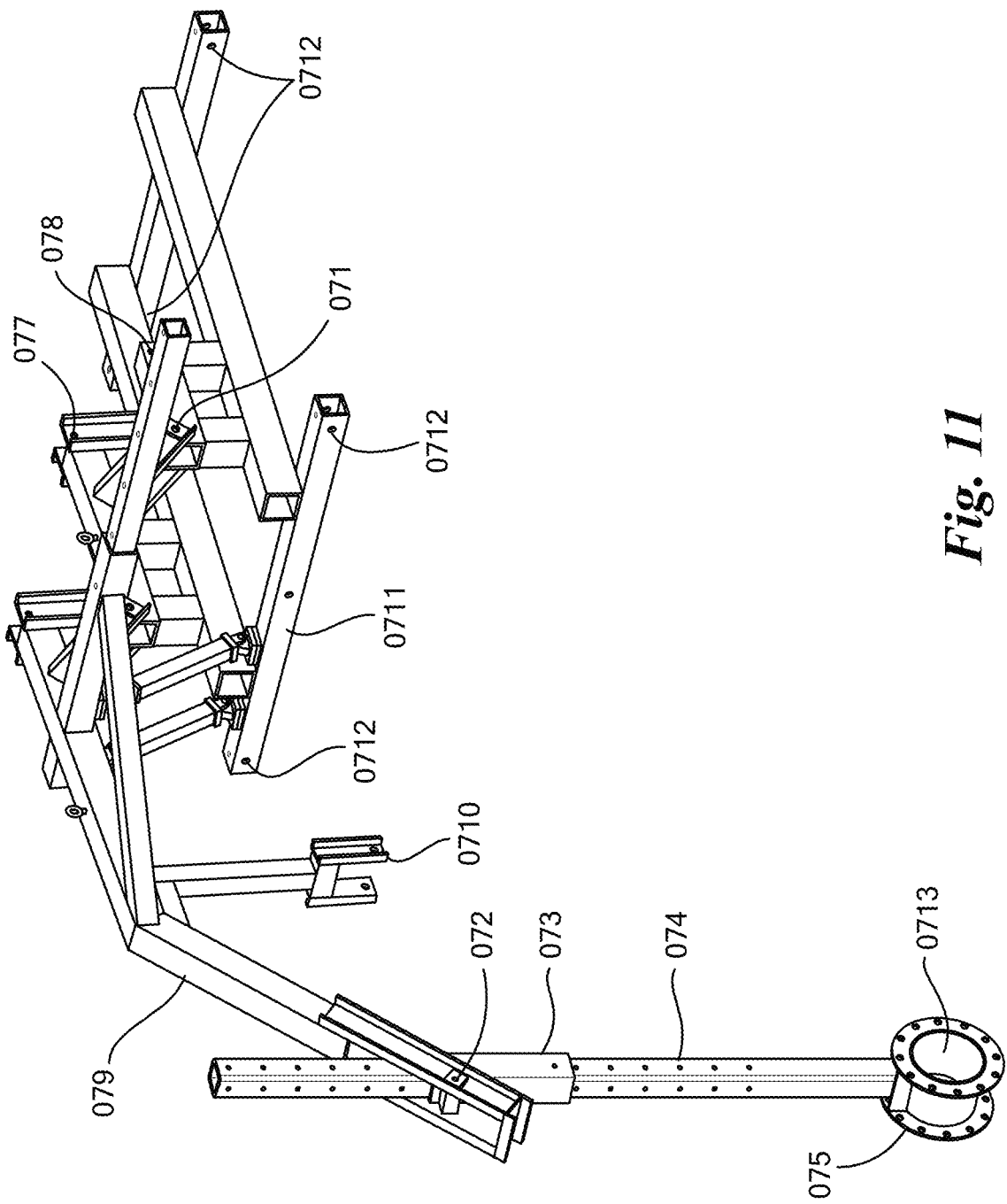
FIG. 11 shows a crane device 070 for deploying various pump suction inlet devices from the side of a vessel with 1 hydraulically powered rotary degree of freedom 071 for deployment and additional, closely coupled, rotary and linear degrees of freedom 072 and 073 to allow said inlet devices, attach to a perforated tube 074, to wave follow when deployed.

FIG. 11 shows the crane 070 used to deploy the auger suction inlets 010 and 020 in system embodiments in FIGS. 2 and 3 for executing pump-to-depth methods 100 and 200, respectively. The crane 070 comprises one powered rotary degree of freedom 071 (actuated by a pair of 2.5" 3000 psi double-acting hydraulic cylinders 076, one passive rotary degree of freedom at pivot 072, and one passive linear degree of freedom provided by sleeve 073. Auger suction inlets 010 and 020 were attached to post 074 via the 12-bolt flange 075 (pipe section 0713 at the bottom of post 074 connects between the auger suction inlet exits and the pump suction hose; collected sargassum and seawater flow through auger suction inlets 010 and 020 and pass through pipe section 0713, before entering the pump suction hose). The auger suction inlets 010 and 028 are able to wave-follow via the linear degree of freedom afforded by sleeve 073. Post 074 is ultimately retained inside the sleeve 073 by a high strength pin inserted into the holes in the top of post 074, above the tope of sleeve 073.

The crane 070 provides the critical function of deploying the auger suction inlets 010 and 020 and retracting the auger suction inlets 010 and 020 for transit. When retracted, the post 074 swings, via pivot 072, into catch 0710 and is locked with a pin so it is secure during transit. When the crane arm 079 is retracted, it is secured to crane base 0711 with high-strength pins inserted in safety pin holes 077 and 078. The entire crane 070 is ultimately secured to the deck with at least four high-strength pins inserted in pinholes 0712, through pairs of pad eyes that straddle the legs of crane base 0711 and are welded/bolted to the deck.

Like the aforementioned hose reel 060, this crane 070 proved quite useful for installing the SOS pilot system on a repurposed vessel, avoiding inevitable unplanned obstacles, and securing it to the deck.

Sequestration Barge/Submarine

Figure 12:
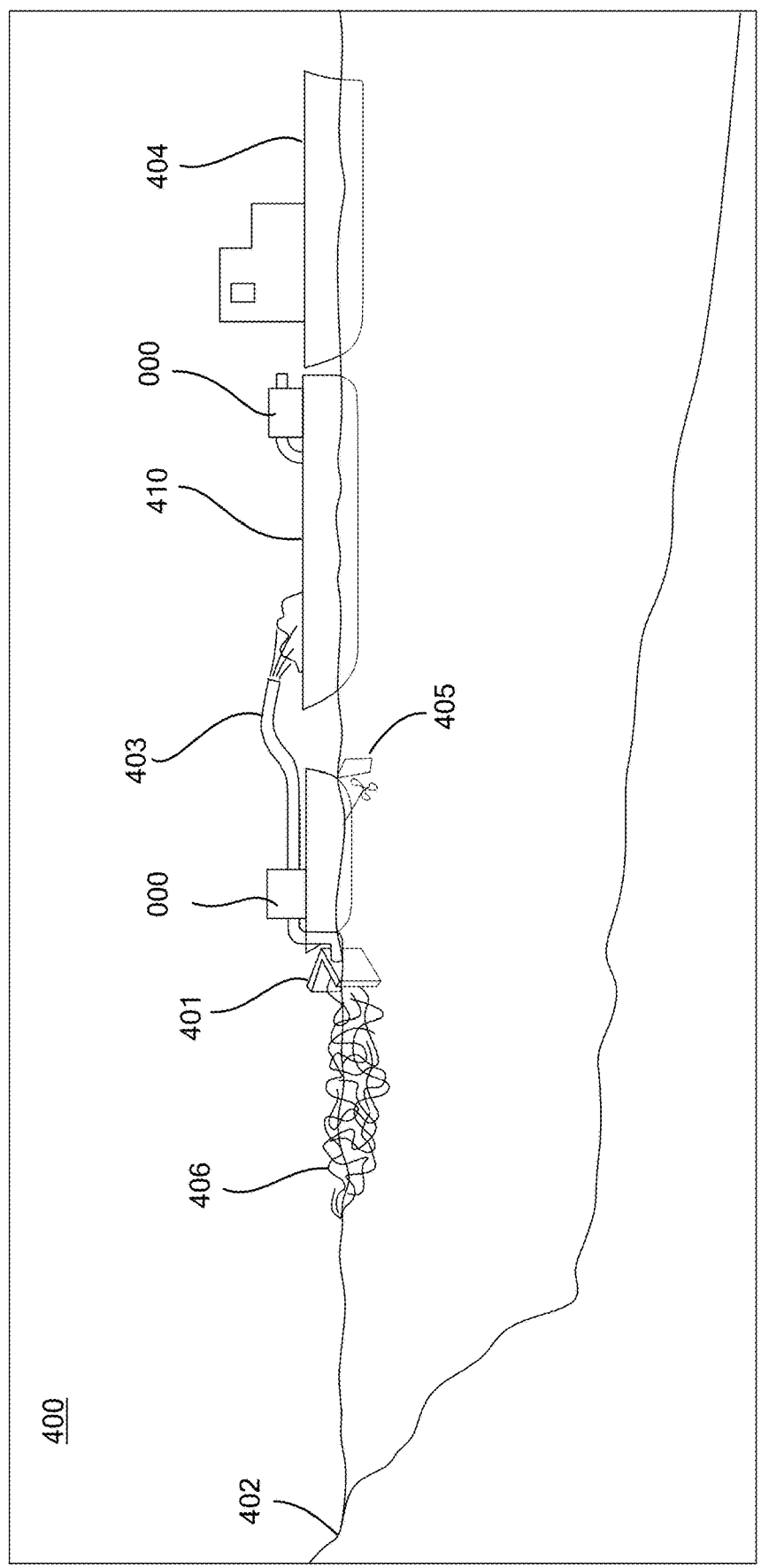
FIG. 12 shows a two-stage, or "ex-situ", system 400 wherein sargassum is first collected and then transported to an appropriate location where it is then sequestered in the deep ocean.

FIG. 12 demonstrates a two-stage, ex-situ pump-to-depth system 400 architecture. In areas 402 where immediate, in-situ pump-to-depth is not possible (i.e., near shore where the water depth is shallower than the critical depth of 150-200 meters), 12-inch 5000 GPM pump(s) 000 and any of the suction inlet devices 010, 020, 030, 040, and 050 (represented by generic suction inlet 401 in FIG. 12) could still be used to collect sargassum 406 into a sequestration barge 410 (either directly pumped into sequestration barge 410, through discharge hose 403, as shown in FIG. 12, or via collection in smaller containers that are then transported to a central loading location for sequestration barge 410) for subsequent transport, by a tug 404, to areas over the deep ocean, where sargassum 406, previously collected, can be pumped-to-depth by 12-inch 5000 GPM pump 000.

This two-stage, ex-situ pump-to-depth system 400 is an important system architecture because such a service could be immediately useful as a means of sustainably disposing of the hundreds of thousands of metric tons of sargassum currently collected from beaches and barriers in places like Puma Cana and Cancun. In emergency situations where an abnormally large and/or unexpected sargassum mat poses an imminent threat to coastline, the sequestration barge 410 can be used to collect this sargassum near shore and then transport it out to deep water for pumping-to-depth. This type of service could be particularly useful to small islands, in the Lesser Antilles, for example, that lack the resources to sustain regular protection/cleanup systems for sargassum, but still stand to suffer a great deal when hit by large sargassum mat.

Figure 13:
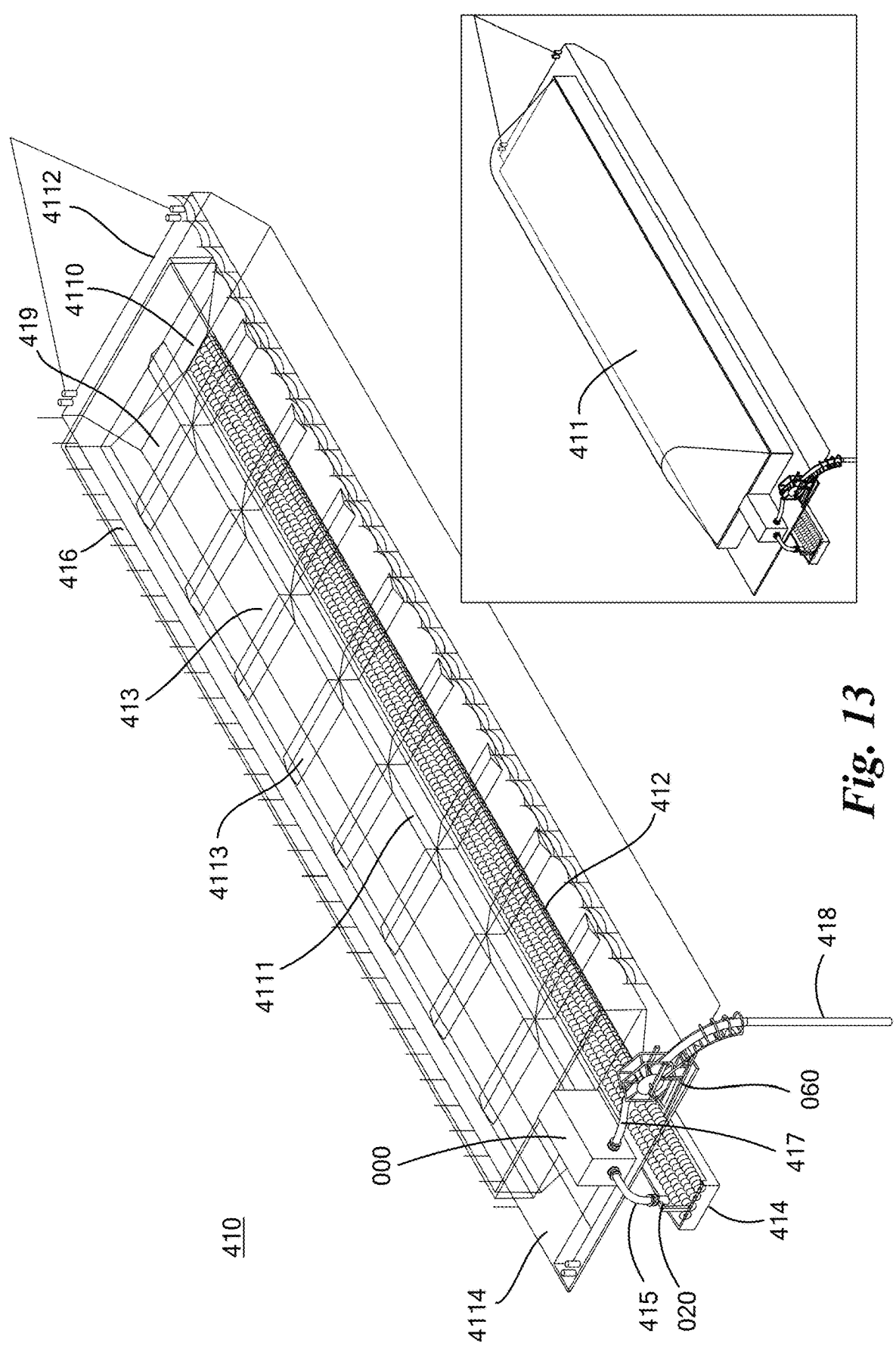
FIG. 13 shows an isometric view of a sequestration barge 410 for transporting sargassum 411 and, once brought to an appropriate location in the ocean, sequestering said sargassum in the deep ocean, by first ejecting/discharging it from said sequestration barge 410 using a number of discharge augers 412 towards a pump suction inlet 413. The pump 000 then pumps the sargassum to depth.

FIG. 13 shows one embodiment of the sequestration barge 410, that uses augers 412 to discharge the sargassum 411 payload from the storage hopper 413 to the suction inlet area 414, where flow into the pump suction hose 415 is facilitated by a co-axial auger suction inlet 020 (may or may not be necessary in practice because the bin discharge augers already meter the flow from the storage hopper 413 into the suction inlet area 414). The 12-inch 5000 GPM pump 000 then pumps-to-depth through pump discharge hose 417, hose reel 060, and 200 meters lay-flat discharge hose 418, which extends to/below the critical depth (150-200 meters). Note that the sequestration barge contains all the necessary equipment (including HPUs and diesel power for pump) for pumping-to-depth such that it can be towed by any vessel (so long as said vessel can pull the sequestration barge).

The sequestration barge 410 storage hopper 413 would have a vee-bottom that ensures all sargassum feeds down towards the pump inlet or auger (it does not have to be designed for mass flow but it is advantageous). It is particularly advantageous for the hopper vee bottom to be fully live with augers 412 to ensure egress of all sargassum. The hopper walls are preferably either vertical (perhaps extending upward to provide more carrying capacity) or inclined at or above the angle of friction of sargassum and the hopper at the expected pressure (appropriate vertical/horizontal shear strength and wall friction tests are preferably conducted). In FIG. 13 the storage hopper has a vertical wall section 416 (for expanded carrying capacity) and a converging wall section 419, which forms the aforementioned vee-bottom. There is a tradeoff between steepness of the walls, lost carrying capacity, and the number of augers required to achieve a fully live bottom. The hopper geometry may further comprise diverging end walls 4110 (~10 degrees) and a lengthwise beam 4111 to create an "expanded flow" condition and reduce the risk of an arch forming (a common problem in bulk material processing). Additionally, widthwise beams 4113, bear the brunt of the weight of sargassum 411 (piled high and inclined at its angle of repose), so as to minimize the pressure at the bottom of the storage hopper 413, limiting the starting torque of augers 412 and decreasing the friction force between the sargassum 411 and the converging wall section 419 in the vee-bottom.

The embodiment of sequestration barge 410 in FIG. 13 is ~50-meter long and has a holding capacity of approximately 1000-5000 cubic meters, uses 4ea, ~40 meter long augers 412 that are 20" OD. Support of augers 412 is difficult because of their length. Intermediate bearings along the auger shaft would require that the flighting be interrupted and could pose a major clogging risk. The support of such long screw lengths could be addressed by (1) supporting the augers alone their entire length on an HDPE or Teflon liner in the casing, (2) support the screws with intermediate, circumferential inserts with HDPE/Teflon linings, (3) inserting rollers on the edges of the screw flights, (4) using intermediate bearing width smooth transitions between screw sections and support bearings, and/or (5) end walls 4110 may also be converging to reduce the length of augers 412. The augers 412 themselves could be of a variable, stepped pitch from ~⅓× to 1× the flight OD along the length (7" pitch at the towed end 4112 and stepping by 1", every 10 ft, so that there is a 20" pitch leading into the suction inlet area 414 the pitch lengthening, never shortening, from the drive side to the discharge side) to even out the extraction pattern from the hopper and decrease the starting and operating torque of the drive motors (smaller motors, smaller HPU/generator). The augers 412 can be individually driven or coupled by chains or spur gears. An auger actually has the most draw-down capacity on the upward moving side of the flight, as it uncovers the void beneath. In order to help mass flow near the edges of the live bottom of angers 412 and prevent buildup-up of material (which leads to arching), both edges of the live bottom should have upward moving flight faces. To accomplish this, maintain symmetry, and have all augers 412 feed towards the same end of the hopper, an even number of both left-handed and right-handed augers is required.

Figure 14:
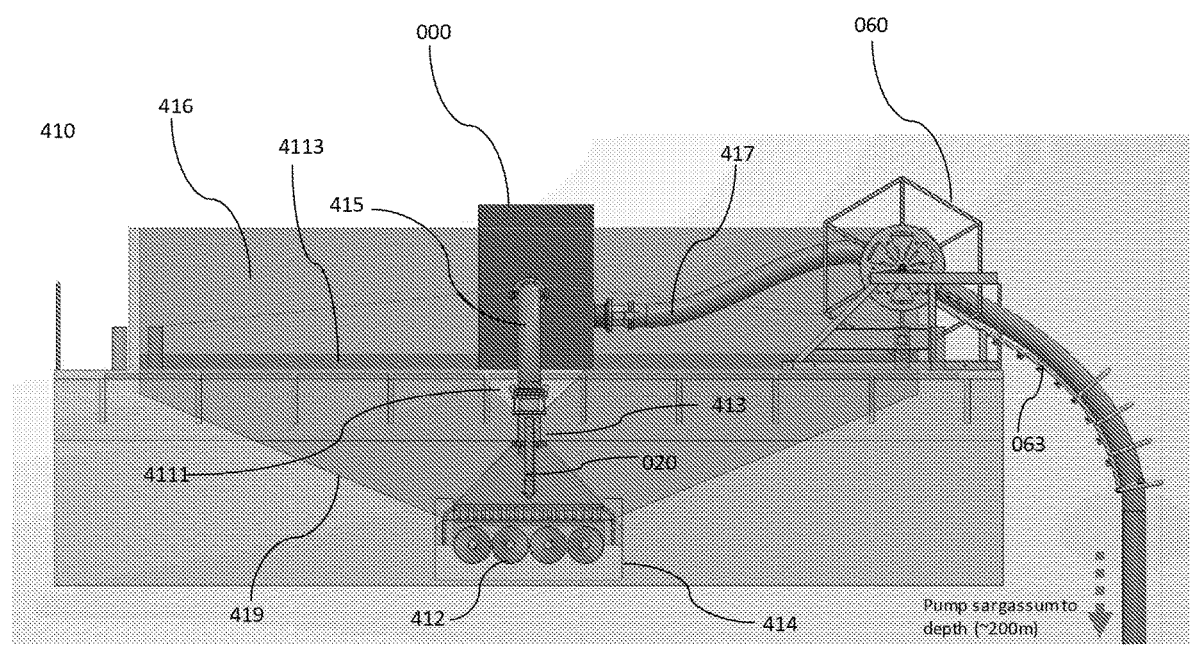
FIG. 14 shows an end-view of the sequestration barge 410 for transporting sargassum 411 and, once brought to an appropriate location in the ocean, sequestering said sargassum in the deep ocean.

FIG. 14 show an end-view of the sequestration barge 410 embodiment from FIG. 13.

Figure 15:
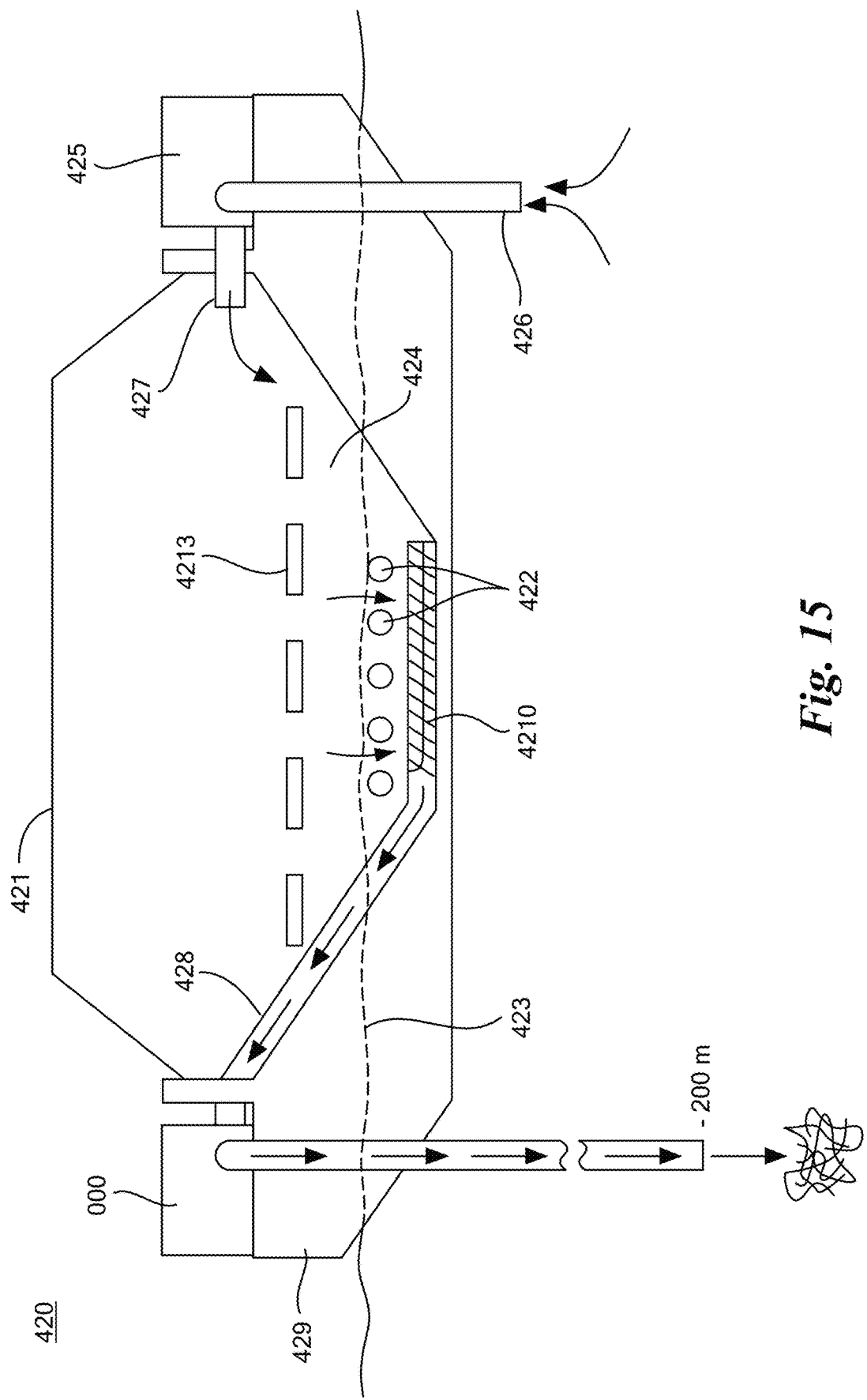
FIG. 15 shows a cross-sectional, side-view of a sequestration barge 420, an alternative to the sequestration barge 410 of FIGS. 13 and 14, which directly pumps sargassum out of a hopper compartment 424 instead of using discharge augers as in sequestration barge 410. Sequestration barge 420 uses portholes 422 and/or secondary pumps 423 to continuously fill hopper compartment 424 with seawater. The resulting sargassum-seawater mixture is then pumped out of hopper compartment 424 and directly pumped to depth.

FIG. 15 shows an alternative embodiment of the sequestration barge 420 (a separate embodiment from the sequestration barge 410) wherein, instead of a live bottom auger discharging to a pump inlet area, the hopper is continuously filled with seawater (from immediate surrounding in the chosen pump-to-depth location), by passive inlets 422 in the barge hull 429, below the waterline 423, or by actively pumping seawater from the surrounding into the hopper region 424 using secondary pump(s) 425, suction hose(s) 426, and discharge hose(s) 427 to inject seawater into the hopper region 424. The resulting seawater/sargassum mixture in the hopper region 424 bottom is then pumped out through a suction hose 428 equipped with an auger suction inlet device (similar to 010 or 020; to meter the flow of solids), to 12-inch 5000 GPM pump 000, and pumped-to-depth (or fed to a another sequestration process).

A special manifestation of the sequestration barge is a submarine container, a soft shelled (perhaps netting or rubber), reinforced (to it holds it shape under suction), streamlined (to reduced towing power consumption) container. Such a container would require less power to tow and require less floatation (less structure) than a surface barge that carries all its payload above the waterline. The preferred embodiment would have the reinforced structure of the submarine covered with rubber or another lightweight, cheap, strong, low friction material impervious to water. The submarine would be roughly ellipsoidal with orifices on both ends of the major axis. Such a submarine container could be loaded at a quayside or at sea via injecting it with a pump from another water laden sargassum container (through one of said orifices). The submarine container could then be discharged via reversing the suction and discharge hoses and pumping the sargassum out, to the critical depth (or to another sequestration process). During both injecting and discharging, there is mass flow of water and sargassum (at differing rates) along the length of the submarine (through the two orifices in both ends), so there is no need for any active discharging components. Alternatively, discharge of sargassum (only discharge) could happen through an extended suction boom along the upper edge of the ellipsoid (the sargassum will float to the top of the submarine container where it will encounter the distributed suction). The submarine will require it be kept afloat with floatation of minimum cross-sectional area and towed through its center of buoyancy.

Ideally, all equipment for sequestration should be mounted on the sequestration barge/submarine itself so that it can be towed by any ordinary tug boat and so that tugs can be rented from maritime operations companies only when needed for journeys to deep water.

Roller Crushing Systems

While pump-to-depth is considered the preferred sargassum sequestration method, crushing and mechanically, irreversibly compromising sargassum pneumatocysts renders sargassum negatively buoyant as well. This could conceivably be done with large rolling crushers (grinding the sargassum or otherwise compromising it could make a mess of things and won't 100% compromise every pneumatocyst, which is quite necessary for negative buoyancy). While crushing systems are not the preferred embodiment of the present invention, several crushing systems are summarized below.

One embodiment of this system calls for a modified tanker/landing craft's bow ramp to be outfitted with a pair of rolling crushers. The cylinders could be rigidly attached to the bow ramps, the dipping into the water and the plane formed between their axes being parallel to the bow ramp. This ramp may or may not be controlled by an active heave compensated winch such that it remains in the water even in rough seas. Alternatively, the rolling pair could be arranged perpendicular to the direction of the ship motion, floating in the water (not rigidly attached to the ship, and with a coefficient of friction and/or submerged depth and/or diameters such that the sargassum is lifted out of the water and into the contact patch of the cylinders.

Figure 16:
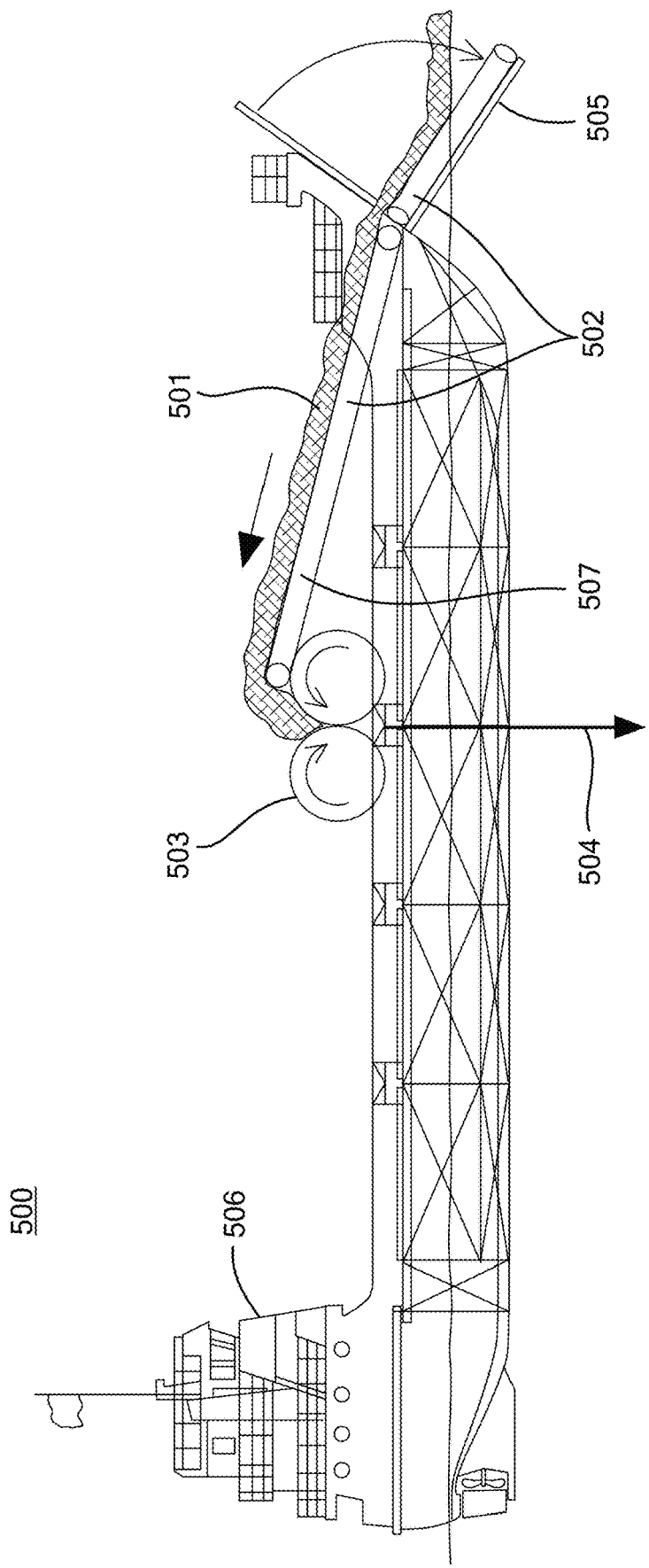
FIG. 16 shows a system 500 for collecting sargassum 501 from the ocean surface using a number of conveyors 502 that deposit the collected sargassum into a set of rolling crushers 503 that irreversibly compromise the sargassum 501 pneumatocysts such that the sargassum 501 is rendered negatively buoyant. The sargassum is then jettisoned back into the ocean through a moon pool 504.

Another onboard implementation of rolling crushers involves placing one, or several, pair(s) of rolling crushers onboard the landing craft 506, shown in FIG. 16, which has a large deck space in front of the bridge. The bow ramp 505 would be outfitted with a conveyor that dips into the water, lifting sargassum 501 out of the water and depositing it into the rolling crushers 503. The conveyor system could also incorporate a separating section 507 to remove turtles from the sargassum (similar to a separator used to separate chicks from their egg shells in hatcheries). Next, a conveyor supported by load cells could provide verification of the amount of sargassum collected and crushed (and this measurement can be corroborated by inline NIR optical spectroscopy). The rolling crushers 503 used could be those already used in mineral processing facilities. After being crushed and rendered negatively buoyant by the rolling crushers 503, the sargassum 501 could be jettisoned through one or more moonpools 504 cut into the hull of the ship, thereby reentering the ocean and sinking. It is recommended that the acquired vessel be "unrestricted" class, or, at least 70 meters in length to ensure stability at sea. Both the pushed and the onboard implementations could benefit from the use of a concentrating funnel to increase the collection width. Instead of moonpools 504, sargassum 501 could merely exit on additional conveyors that jettison it over/through the gunwales of the ship.

The systems can be thought of in terms of where the rolling crushers are placed (on deck or in the water) and how they are oriented (vertical or transverse). One can also imagine a system with outriggered rollers on the port and starboard sides of a ship, driven by outboard actuators, that are deployed in and crush sargassum in the water, without the need to remove it from the water. The implementation could be deployed on either a landing craft or supply-type ship—any vessels with enough deck space for the hydraulic arms, HPUs, repairs, and maintenance.

Rolling crushers may not be able to 100% crush all sargassum pneumatocysts (necessary for sinking) and, even if they do, there may still be entrained air that can keep the plant afloat for an unknown period of time. It cannot be presumed that ocean mixing will remove air over time as the associative forces responsible for entrained air are quite strong. Even if crushing causes complete annihilation of vesicles and leaves such that they cannot entrain air, discharging the remnants of sargassum onto the surface of the ocean leaves the possibility that the sargassum will be carried, by ocean currents, to undesired locations, before finally coming to rest (shallow areas with photosynthesizing plants, critical habitats, or even coastal/beach areas). Hence pumping the crushed sargassum to 10 meters or greater depth is preferred so pump turbulence will disrupt and free air bubbles.

SOScarbon Planning Model

Figure 17:
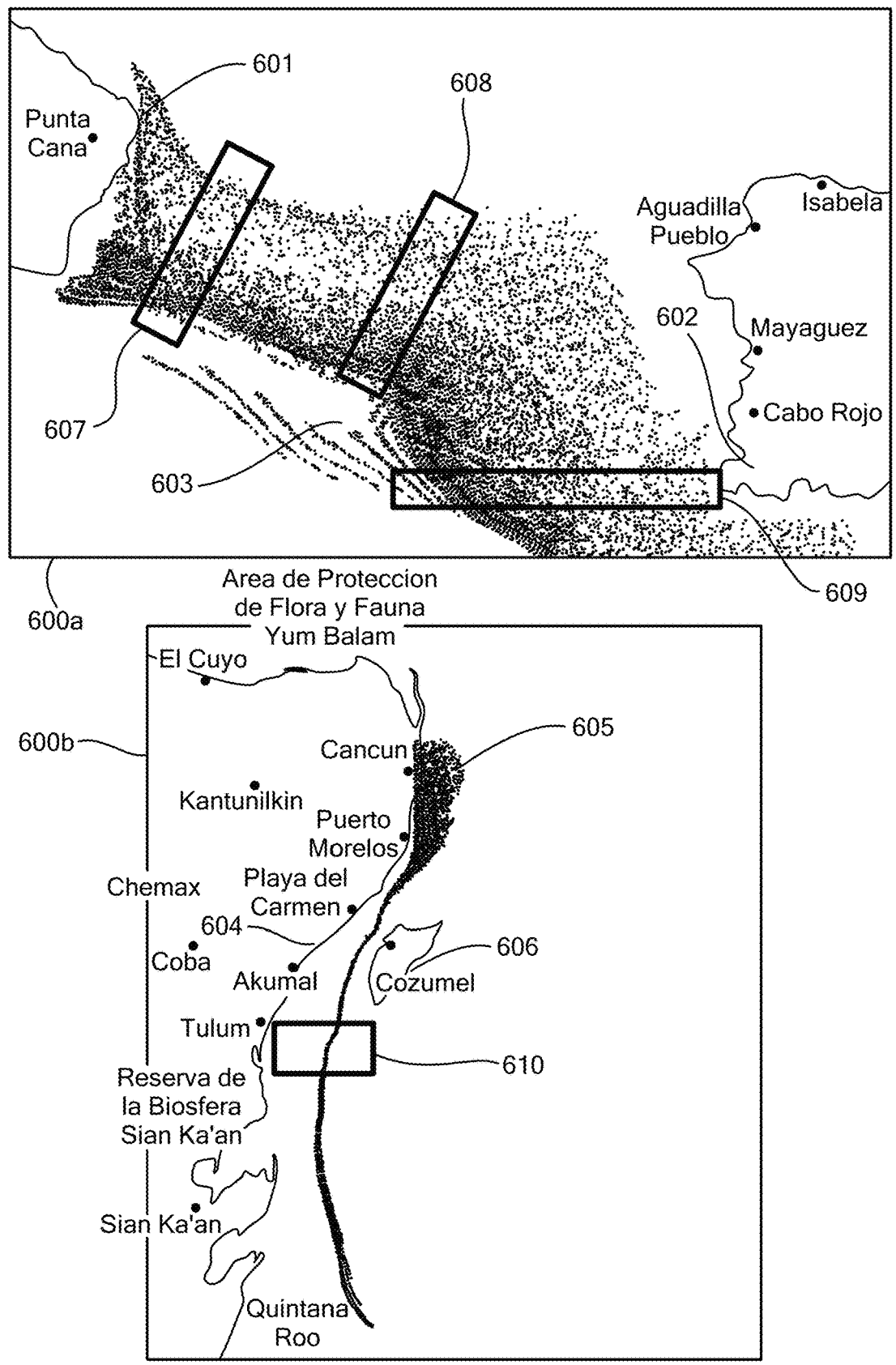
FIG. 17 shows outputs from a system 600 for directing sargassum collection Vessels in various locations.

FIG. 17 shows a planning model 600 for identifying and predicting the movement of sargassum in the Caribbean, for the purpose of directing fleets of SOScarbon vessels. Said model 600 is critical to the success of SOScarbon for several reasons:

1. SOS will become prohibitively expensive if any and all sargassum near critical coast is sunk indiscriminately. Planning model 600 will direct an SOScarbon fleet, in real-time, so that SOScarbon vessels can precisely target pump-to-depth efforts on sargassum that is destined for critical coastline, without managing sargassum that is destined for uninhabited areas, for example.

2. Planning model 600 could help to plan for and study the potential feasibility and/or effectiveness of SOScarbon implementation in new areas.

3. Planning model 600 could be used to verify the additionally of carbon offsets generated by SOScarbon, by determining where sequestered sargassum would have otherwise landed, and what would've happened to its carbon content.

600*a* shows results of a particle forward-tracking model in the Mona Passage wherein the original "stain" of 1000 particles is released at 17.85 N. 292.65 E. and HYCOM ocean current data from Feb. 18, 2019 to Feb. 25, 2019 is used to evolve the simulation. From models like 600*a*, it can be determined that sargassum bound for Punta Cana 601 flows westward, in tight proximity to the south coast of Puerto Rico 602, and enters the Mona Passage in the southeastern corner of the channel. In the Mona Passage, sargassum drifts in an S-curve, first due north, then northwest across the channel, and then transitioning northward again, before, presumably, being trapped by coastal currents and making landfall. The entire crossing takes approximately 7 days. The overlay of output from these models from historical data, shipping traffic maps, knowledge of sargassum mat shapes in particular areas (from satellite imagery), bathymetric maps, etc., can be used suggest potential SOScarbon operational strategies. Satellite imagery shows that sargassum mats appear more concentrated, dense, and concentric near its entrance to the Mona Passage and upon turning northward after crossing the channel. While crossing the Mona Passage, sargassum is strung out in long "windrows" aligned with the direction of the wind. This suggests that either area 607 or area 609 are most advantageous for pumping-to-depth, with area 609 having the added benefit that it is deep enough there to claim carbon offsets for pumping-to-depth in that location.

Similarly, a particle backtracking model in 600*b* shows that almost all the sargassum hitting Cancun 605 travels straight through the straight between Cozumel 606 and the mainland 604. A favorable location for pumping-to-depth, therefore, is area 610, just south of the straight, where depth is sufficient and sargassum is crowded into large mats because of the bottleneck nature of the straight.

In the future, it will be particularly useful if real time planning occurs with even higher accuracy and resolution to direct real SOScarbon vessels. The historical trend (from recent, monthly, or perhaps yearly backtracking models) and the 7-10 day forward tracking model should be used in concert to develop a "landfall probability index," assigned to each ~0.08°×~0.08° bin (resolution of HYCOM dataset) in the area of interest, indicating the relative probability of sargassum hitting critical coast. With mats identified and prioritized based on "landfall probability index", optimized paths for SOScarbon vessel(s) can be suggested to collect mats in advantageous locations (e.g. where mats are large and concentrated) using as little fuel/time as possible. Weights applied to the output from backtracking (of historical data) and outputs from forward-tracking (of futuristic forecast data) should be defined through Spearman correlation (Spearman, 1918) with actual sargassum landfall observations from satellite imagery. The model can be further improved by in-situ measurement of salinity, temperature, surface velocity/direction, and current velocity direction performed by SOScarbon vessels in the area of operation.

In the future, a current dataset different from HYCOM may be used. HYCOM gives daily data for ocean surface currents with 0.08° resolution from satellite observation and direct measurement (Putnam et al., 2018). The datasets capture fronts, filaments, and eddies (Chassignet et al., 2007, Putman and He, 2013), but not wind-induced currents ("Stommel shear"; Rio et al., 2014; Bonjean and Lagerloef, 2002), direct momentum transfer from wind to pelagic debris ("windage"; Trinanes et al., 2016), or waves ("Stokes drift", Monismith and Fong, 2004).

Additionally, in the future, Lagrangian models could be specifically improved for modeling sargassum—the effect of surface currents, windage, and waves on the path of a Lagrangian drifter depends on its buoyancy, form-factor, and surface texture (Putnam et al., 2018). These characteristics likely change with aging/damage (from waterlogging and feeding), encrustation, etc. (Johnson and Richardson, 1977, Woodcock, 1993, Zhong et al., 2012). There is a large degree of sophistication yet to be harnessed.

In the future it may also be wise to incorporate 3D ocean, benthic currents, not only for the purpose of better predicting sargassum movement, but also for the purpose of predicting where sunken sargassum will migrate and accumulate.

Sequestration Platform

Instead of a specially designed barge/submarine, the sargassum laden barge/submarine could transfer its payload to a semi-permanent platform comprising a gantry-like crane bearing an open-bottomed weighted cage that pushes sargassum down to a depth of ~150-200 meters before pulling the cage back up to the surface to perform the operation again. Such an ocean platform is illustrated in FIG. 18. Various barge configurations exist that might make unloading sargassum into the open ocean platform most efficient (side-dump/bottom-dump barges, etc.), however all concepts revolve around the open ocean platform with the open-bottomed weighted cage. The open ocean platform may have various containment devices, comprising fences, walls, and booms, to contain the sargassum as it is emptied into the platform. In the case of a sequestration submarine as described immediately above, the submarine container itself could be lowered to depth and then bottom of the submarine open via an ultrasonic release, for example, the sargassum released and the submarine container lifted back to the surface.

The system described herein is also applicable to other types of floating biomass or debris in different parts of the world, such as algae, seaweed, jellyfish, and plastic in the great garbage patch. Preferred embodiments of methods and machines to collect and sequester sargassum, have been described, but their utility beyond application to sargassum is apparent in applications involving other types of floating biomass or pollution in many different parts of the world.

Another auger embodiment is the "modified snowblower" is similar to a commercial snowblower, used in the northeast for clearing roads for example, except for several key differences that optimize it for collecting waterborne sargassum. The blower does not have the issue of a pump being starved of flow cavitating. First, the blower may be fitted with a funneling structure (a vee/plane/scoop), partially mesh/wire/cable/string/chain link and partially solid, to funnel sargassum toward the impeller. Further, the left-handed/right-handed auger is supported only from the sides, features no dimension smaller than the characteristic dimension of sargassum, and may comprise fingers/brushes in addition to solid flighting. The primary advantage of the modified snowblower is that, just like an impeller pump, it will "throw" water and sargassum, except that it will feed regardless of its depth in the water whereas a pump will lose suction if its inlet comes out of the water and its inlet is relatively smaller making it very difficult to self-feed without pulling water and exploiting it as a carrier fluid for sargassum. The blower could be mounted on the front of a barge and the discharge chute of the blower can be directed into to a container onboard. Such a system could aid or replace the conveyor barges currently being used to clean barriers. An exemplary illustration of the core module in the modified snowblower is shown in FIG. 8. The blower may also feature optimized impellers, partially or completely, of elastic material, or with preloaded rigid impeller blades, to improve the transfer of momentum from the impeller blades to sargassum. Soft impeller materials will also allow the impeller blade to touch the volute (whereas a metal impeller requires healthy spacing) which will reduce materials wedging between the impellers and the volute.

What is claimed is:

1. An apparatus for sequestering seaweed in a body of water by changing buoyancy, wherein, in operation, the apparatus causes said seaweed to transition from having a positive buoyancy to a negative buoyancy, wherein the apparatus comprises a pump and a hose, wherein, in operation, said pump is at the water's surface and said hose extends to below a critical depth, said critical depth being a depth that ensures that, as a result of having undergone said transition, said seaweed will remain below a mixed layer of said body of water and said pump pumps said seaweed from said surface of said body of water to said critical depth.

2. The apparatus of claim 1, wherein said critical depth is below a depth at which said seaweed undergoes said transition and also below a mixed layer in said body of water.

3. The apparatus of claim 1, wherein said pump and hose are configured to transport said seaweed to a depth that exceeds one hundred meters.

4. The apparatus of claim 1, wherein said apparatus is configured to transport said seaweed to a depth that exceeds one hundred meters but is above the bottom of said water body.

5. The apparatus of claim 1, further comprising an ocean-going self-propelled vessel, wherein said pump and said hose are on board said vessel.

6. The apparatus of claim 1, further comprising a seaweed gathering mechanism, operable on the surface of the body of water, configured for directing said seaweed to the pump.

7. The apparatus of claim 1, further comprising a purse seine configured for gathering said seaweed and directing said seaweed to the pump.

8. The apparatus of claim 1, further comprising feeder for feeding seaweed to said pump.

9. The apparatus of claim 1, further comprising an inlet to said pump, said inlet comprising an auger for driving said seaweed towards said pump.

10. The apparatus of claim 1, further comprising a wave-following crane and an inlet to said pump, wherein said wave-following crane, as a result of being coupled to said inlet, causes said inlet to maintain a constant depth below said water's surface.

11. The apparatus of claim 1, further comprising a boom having apertures, said apertures being in communication with a low-pressure region such that seaweed is drawn through said apertures and propelled toward said pump.

12. The apparatus of claim 1, further comprising a container that receives said seaweed and carries said seaweed through said body of water to a location at which sequestration takes place.

13. The apparatus of claim 1, further comprising a barge and a conveyor, wherein said barge carries said seaweed in a cargo space and wherein said conveyor extends along a floor of said cargo space to carry seaweed to said pump.

14. The apparatus of claim 1, further comprising a conveyor and a floating hopper that carries said seaweed, said hopper comprising portholes for admitting seawater into said hopper to form a slurry containing said seaweed, wherein said conveyor that extends through said slurry for conveying said slurry to said pump.

15. The apparatus of claim 1, wherein, in operation, said hose extends to a depth in a range from 50 m to 200 m.

16. The apparatus of claim 1, wherein the apparatus is configured for sinking sargassum seaweed, the apparatus further comprising:
a vessel on which said pump is mounted and wherein, in operation, said hose extends from said vessel to below the critical depth;
a hose reel on the vessel for reeling and unreeling the hose;
a suction hose through which in operation said sargassum seaweed enters said pump;
a suction inlet at an entrance of said suction hose, said suction inlet being configured to float on the surface of said body of water, for facilitating flow of said sargassum seaweed into said entrance of said suction hose;
a crane for deploying and recollecting said suction inlet and said suction hose, attached thereunto, into and out of said body of water; and
a boom or a funnel structure for gathering or concentrating said sargassum seaweed near said suction inlet.

17. The apparatus of claim 1, further comprising:
a vessel for storing, transporting, and sinking said sargassum seaweed in said body of water, wherein said pump is mounted on said vessel, said sargassum having been previously collected and loaded onto said vessel;
a hopper region on said vessel, in which said sargassum seaweed is stored after having been collected;
a hose reel for reeling and unreeling the hose;
a suction hose through which said sargassum seaweed enters said pump;
a suction inlet at an entrance of said suction hose, for facilitating flow of said sargassum seaweed, from said hopper region and into said entrance of said suction hose; and
a secondary pump for bringing water from said body of water into said hopper region in order to displace said sargassum seaweed into said suction hose, thereby causing said seaweed to enter said pump and to subsequently be pumped to said critical depth.

18. The apparatus of claim 1, wherein said seaweed reversibly transitions from having said positive buoyancy to said negative buoyancy, whereby retrieval of said seaweed from below said critical depth restores said seaweed to positive buoyancy.

19. A method comprising sequestering seaweed in a body of water, wherein sequestering seaweed comprises causing said seaweed to undergo a transition from having a positive buoyancy to a negative buoyancy and wherein causing said seaweed to undergo said transition comprises causing seaweed to enter a pump at a surface of said body of water and using said pump to pump said seaweed through a hose that extends into said body of water to a depth at which said seaweed undergoes said transition, whereby seaweed exits said hose at or below said depth.

20. The method of claim 19, wherein causing said seaweed to undergo said transition comprises transporting said seaweed to below a critical depth in a body of water that has a mixed layer and an unmixed layer below said mixed layer, said critical depth being a depth below which said seaweed attains neutral buoyancy, wherein said critical depth is below said mixed layer.

21. The method of claim 19, further comprising causing the seaweed to sink to the bottom of a body of water.

22. The method of claim 19, further comprising selecting said seaweed to be sargassum.

23. The method of claim 19, wherein said pump and hose are on board a vessel, said method further comprising using said vessel to intercept seaweed that is floating in a region of open water and carrying out said sequestration at said region.

24. The method of claim 19, further comprising releasing said seaweed at said critical depth.

25. The method of claim 19, wherein sequestering seaweed further comprises collecting said seaweed at a first location, transporting said seaweed to a second location, and causing said seaweed to undergo said transition at said second location.

26. The method of claim 19, further comprising releasing said seaweed below said critical depth but above the bottom of said body of water and, causing the seaweed, which has a negative buoyancy, to continue sinking to the bottom of said body of water.

27. The method of claim 19, wherein said seaweed comprises sargassum seaweed, and wherein causing said seaweed to undergo a transition from having a positive buoyancy to a negative buoyancy comprises causing air-filled pneumatocysts of said sargassum seaweed to be sufficiently compressed to render said seaweed to be negatively buoyant.

28. The method of claim 19, wherein said seaweed comprises sargassum seaweed, and wherein causing said seaweed to undergo a transition from having a positive buoyancy to a negative buoyancy comprises causing air-filled pneumatocysts of said sargassum seaweed to buckle, whereby said pneumatocysts continue to be air filled while said seaweed is negatively buoyant.

* * * * *